United States Patent
Mazurek

(10) Patent No.: US 11,799,385 B1
(45) Date of Patent: Oct. 24, 2023

(54) SYNCHRONOUS QUADRATURE CURRENT CONTROLLED RESONANT POWER CONVERTER

(71) Applicant: Lee Fredrik Mazurek, Groton, CT (US)

(72) Inventor: Lee Fredrik Mazurek, Groton, CT (US)

(73) Assignee: Lee Fredrik Mazurek, Groton, CT (US)

( * ) Notice: Subject to any disclaimer, the term of this patent is extended or adjusted under 35 U.S.C. 154(b) by 0 days.

(21) Appl. No.: 18/337,014

(22) Filed: Jun. 18, 2023

(51) Int. Cl.
*H02M 3/335* (2006.01)
*H02M 1/00* (2006.01)
*H02M 1/42* (2007.01)

(52) U.S. Cl.
CPC ..... *H02M 3/33584* (2013.01); *H02M 1/0025* (2021.05); *H02M 1/4241* (2013.01); *H02M 3/33515* (2013.01); *H02M 3/33592* (2013.01)

(58) Field of Classification Search
CPC .... H02M 1/0025; H02M 1/12; H02M 1/4241; H02M 3/335; H02M 3/33515; H02M 3/33592; H02M 1/42
See application file for complete search history.

(56) References Cited

U.S. PATENT DOCUMENTS 10,978,871 B2 * 4/2021 Zhou ................. H02M 3/1582
2021/0265907 A1 * 8/2021 Malone ............. H02M 3/33571

* cited by examiner

*Primary Examiner* — Gary L Laxton

(57) ABSTRACT

A synchronous quadrature current compensator and synchronous average harmonic current compensator efficiently control harmonic current flow between isolated bridges of a clocked bidirectional resonant power converter. The synchronous average harmonic current compensator controls on a superposition of low frequency and switching current across nodes of a current controlled bridge to track commanded line current and harmonically linearize dynamic coupling admittance to a voltage controlled bridge. A difference amplifier attenuates the low frequency and reactive part of a bridge current signal to the quadrature current compensator. An error amplifier sums a synchronously modulated quadrature current signal, used to estimate transmitted harmonic current, to track a safely limited quadrature current command reference by generating a duty cycle. A line is inductively connected to the voltage controlled bridge or the current controlled bridge, with the other bridge driven with a duty cycle to command harmonic current flow between bridges.

20 Claims, 12 Drawing Sheets

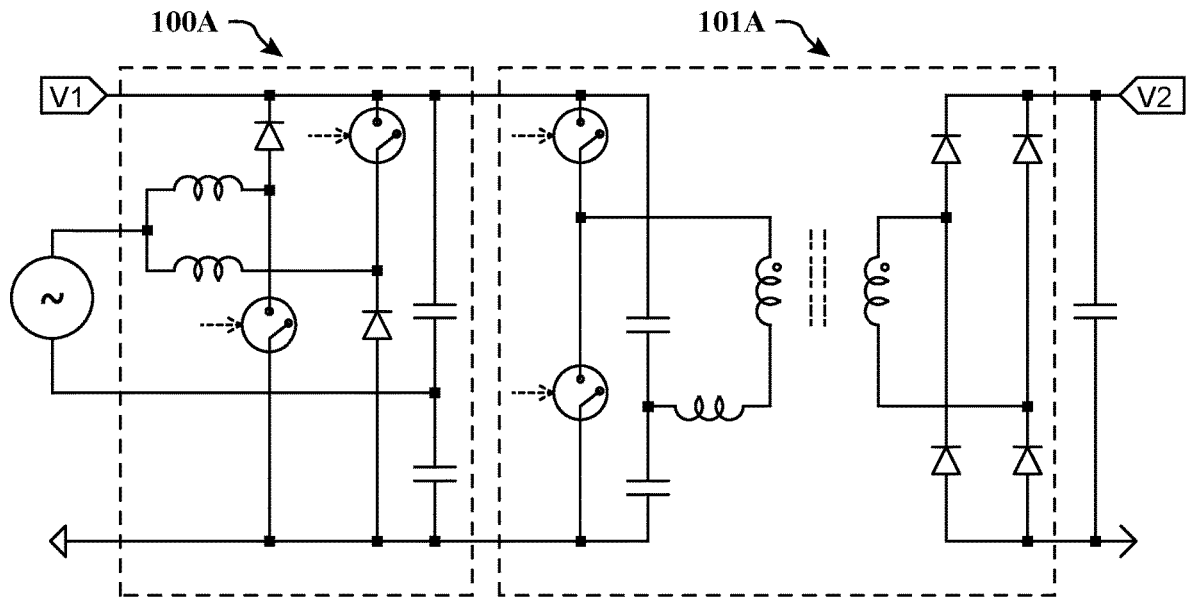
PRIOR ART    FIG. 1A
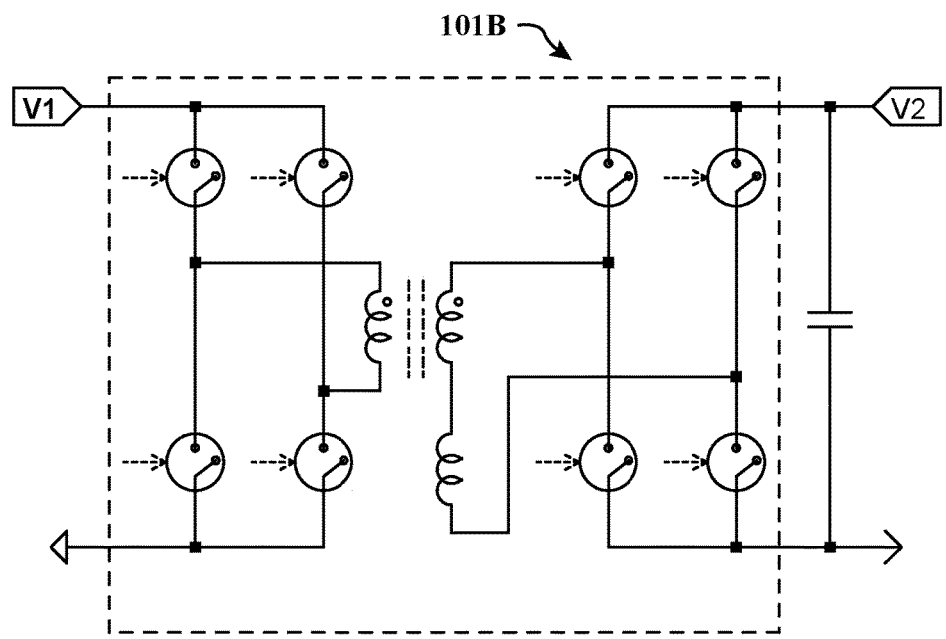
PRIOR ART    FIG. 1B

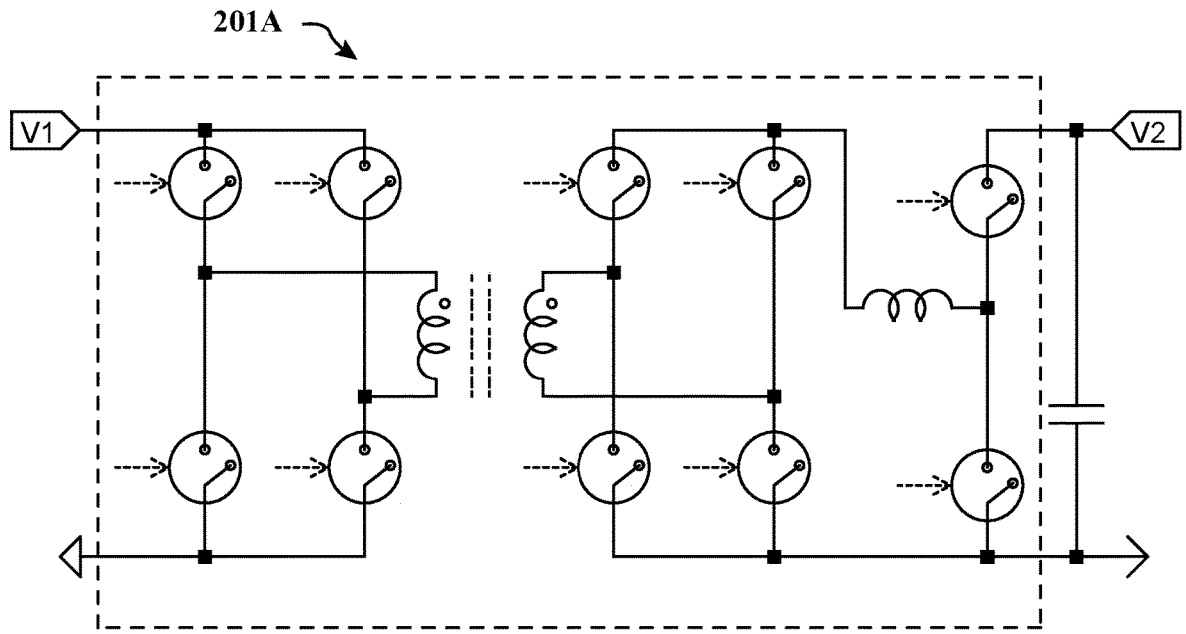
PRIOR ART FIG. 2A
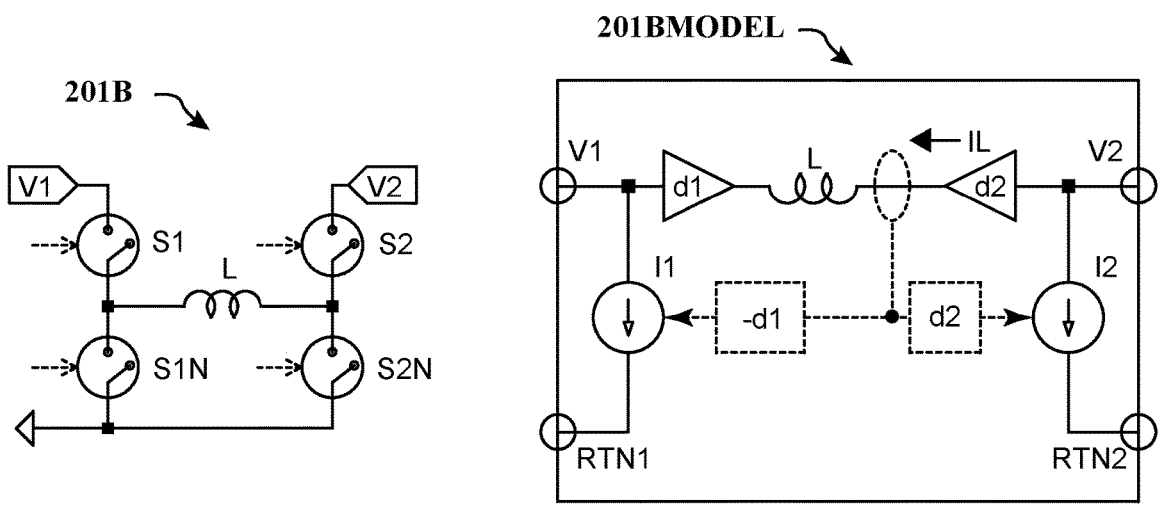
FIG. 2B
PRIOR ART

SYNCHRONOUS QUADRATURE CURRENT CONTROLLED RESONANT POWER CONVERTER

CROSS-REFERENCE TO RELATED APPLICATIONS

This application references the following applications by the same inventor: U.S. non-provisional applications Ser. No. 18/336,984 filed Jun. 17, 2023, Ser. No. 17/727,757 filed Apr. 24, 2022, Ser. No. 17/727,774 filed Apr. 24, 2022, Ser. No. 17/731,632 filed Apr. 28, 2022, and respective U.S. provisional applications 63/197,556 filed Jun. 7, 2021, 63/197,572 filed Jun. 7, 2021, and 63/306,334 filed Feb. 3, 2022.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTOR

Not applicable

BACKGROUND OF THE INVENTION

The present disclosure generally relates to a bidirectional electronic power conversion system and, more specifically, to a synchronous resonant power converter with quadrature current control and methods of controlling the same.

Switching power converters are used to convert between line AC input and isolated DC output with low transmission loss. In prior art (FIG. 1A) two switching stages are employed respectively to: perform rectification and power factor correction (100A), and perform isolated regulated DC to DC voltage conversion (101A). The aforementioned prior art example uses current interleaving to improve power efficiency of switching electronics and material efficiency of an inductive line filter. A resonant DC-DC converter (101A) regulates output voltage by controlling apparent output impedance relative to a load by varying the switching frequency. A prior art phase shift method for bidirectional DC-DC conversion is shown in FIG. 1B. An inductive phase shift DC-DC converter (101B) regulates output voltage by controlling the transmitted current to a load by varying relative bridge phase. A prior art method for (isolated) synchronous voltage mode bidirectional DC-DC conversion stage (201A) is illustrated in FIG. 2A, with the equivalent non-isolated buck-boost stage shown (201B) in FIG. 2B. The converter shown in FIG. 2B is modeled using equivalent blocks in 201BMODEL, where a first duty cycle d1 is used to control complementary switches S1 and S1N, and a second duty cycle d2 is used to control switches S2 and S2N to impose a voltage across an inductor, L. The model shows power conservation across the buck-boost converter from the first voltage bus, V1, to the second voltage bus, V2. The current flow due to the scaled voltages across the inductor results in proportionally scaled current from the first voltage bus to its return, RTN1, and the second voltage bus to its return, RTN2. The non-isolated model shown in FIG. 2B allows for widely varying voltage gain and efficient power transfer.

The illustrated prior art power converter technologies require multiple stages with associated parts costs and cascaded efficiency losses. Other prior art methods which do not rely on bridge stages, such as the auk single stage converter, reduce switching elements at the expense of increased current stress, and pass current ripple due to power factor correction directly to the load. Prior attempts to synthesize a single stage power converter from the stages shown include superposition of the AC/DC power factor correction stage shown in 100A with the DC/DC conversion stage shown in 101B. For the prior design, large recirculating currents flow across the inductor used for phase shift current regulation when it is sized so that the maximum current is available over the full duty cycle modulated voltage input range. The prior approach for resonant power conversion (101A) is difficult to synthesize as a single stage due to the widely varying input voltage range and load dependent behavior. The prior approach for voltage mode conversion (201) has additional switches to support boost functionality and often requires additional components to snub voltage transients due to transformer leakage inductance. It is desirable to develop a single stage power converter which allows for arbitrary AC line voltage inputs, provides for buck-boost voltage regulation between its DC ports, and allows for series and parallel connection of multiple converter elements for improved power and magnetic integration.

BRIEF SUMMARY OF THE INVENTION

In one aspect, the objective of this invention is to implement a single stage bidirectional power converter which allows for line voltage connection, implements buck boost regulation between its DC ports, and allows for material and power efficient series and parallel operation. This objective is accomplished in the present invention by controlling on synchronous average harmonic and quadrature bridge current. An implementation of the presently summarized invention is illustrated in FIG. 3, which is further comprised of a voltage controlled bridge (301) and a current controlled bridge (302). A bridge current sensor (306) outputs a voltage proportional to the current across switched nodes, VC and VD, which drives multiple current control processes. A synchronous average harmonic current (SAHC) compensator simultaneously feeds back on bridge current in the non-modulated and modulated reference frame to respectively control on low frequency bridge current and linearize the current transfer at the switching frequency. The controller superimposes an active admittance to adjust a passive resonant network (305A and 305B) to linearize the effective resonance about the switching frequency, which results in a linearized coupling between the bridges. The current which is transferred between the bridges is orthogonal to a synchronous clocking square wave at the operating point established by the SAHC controller. Harmonically transferred current is estimated by modulating sensed bridge current by a quadrature square wave (QSQ), and the resulting signal is used to drive a quadrature current controller (308) to modify a duty cycle to track a quadrature current command (IQCMD). In the first embodiment shown in FIG. 3, a voltage command (VCMD) is used to drive a pulse width modulation stage (307) to control the voltage controlled bridge (301). The voltage controlled bridge is coupled by its bridge nodes (VA and VB) to a line voltage (VAC), and coupled to the current controlled bridge through an isolation transformer (310A and 310B) to perform isolated power transfer using a single stage. The bridge nodes are shown with anti-phase modulation to differentially cancel the first switching harmonic across the line so that inductive filtering requirements are reduced, and further cancellation is achievable by using multiple converters clocked for phase cancellation in series. A second embodiment is illustrated in FIG. 12 which couples a line voltage to a current controlled bridge (1202), instead of a voltage controlled bridge (301), to facilitate line current controlled processes such as power factor correction. In the second embodiment, a current command is driven to multiple synchronous average harmonic current controllers (SAHC1 and SAHC2) to balance the low frequency and harmonic currents through efficiently integrated transformer components (1210A and 1210B respectively). Further harmonic cancellation is achievable using multiple paralleled clocked converters. Embodiments of the presently described invention allow for voltage or current controlled line connection, with buck boost regulation between isolated DC ports and efficient series and parallel connection with favorable magnetic and inductive filter integration.

These and additional objects and advantages provided by the embodiments described herein will be more fully understood in view of the following detailed description, in conjunction with the drawings.

BRIEF DESCRIPTION OF THE SEVERAL VIEWS OF THE DRAWING(S)

FIG. 1A illustrates a prior art architecture for a two stage power converter which includes a current interleaved AC/DC and power factor correction stage, and an isolated resonant DC/DC power converter stage.

FIG. 1B illustrates a prior art inductive phase shift dual active bridge isolated bidirectional DC/DC power converter stage.

FIG. 2A illustrates a prior art buck-boost isolated voltage mode pulse width modulation DC/DC power converter stage with synchronous rectification.

FIG. 2B illustrates a prior art non-isolated buck-boost DC/DC power converter stage in schematic and model form.

DETAILED DESCRIPTION OF THE INVENTION

Embodiments described herein generally relate to a line connected resonant power converter and methods of forming a line connected resonant power converter using a combination of synchronous average harmonic current control and quadrature current control. As shown and described herein, new embodiments of line connected resonant power converters with synchronous average harmonic current control and quadrature current control are provided. The presently invented converter controls the power transfer between isolated bridges to allow for single stage buck-boost DC/DC voltage regulation where one of the isolated bridges is also line connected, and allows for clocked series and parallel operation with good power and magnetic material efficiency.

Figure 3:
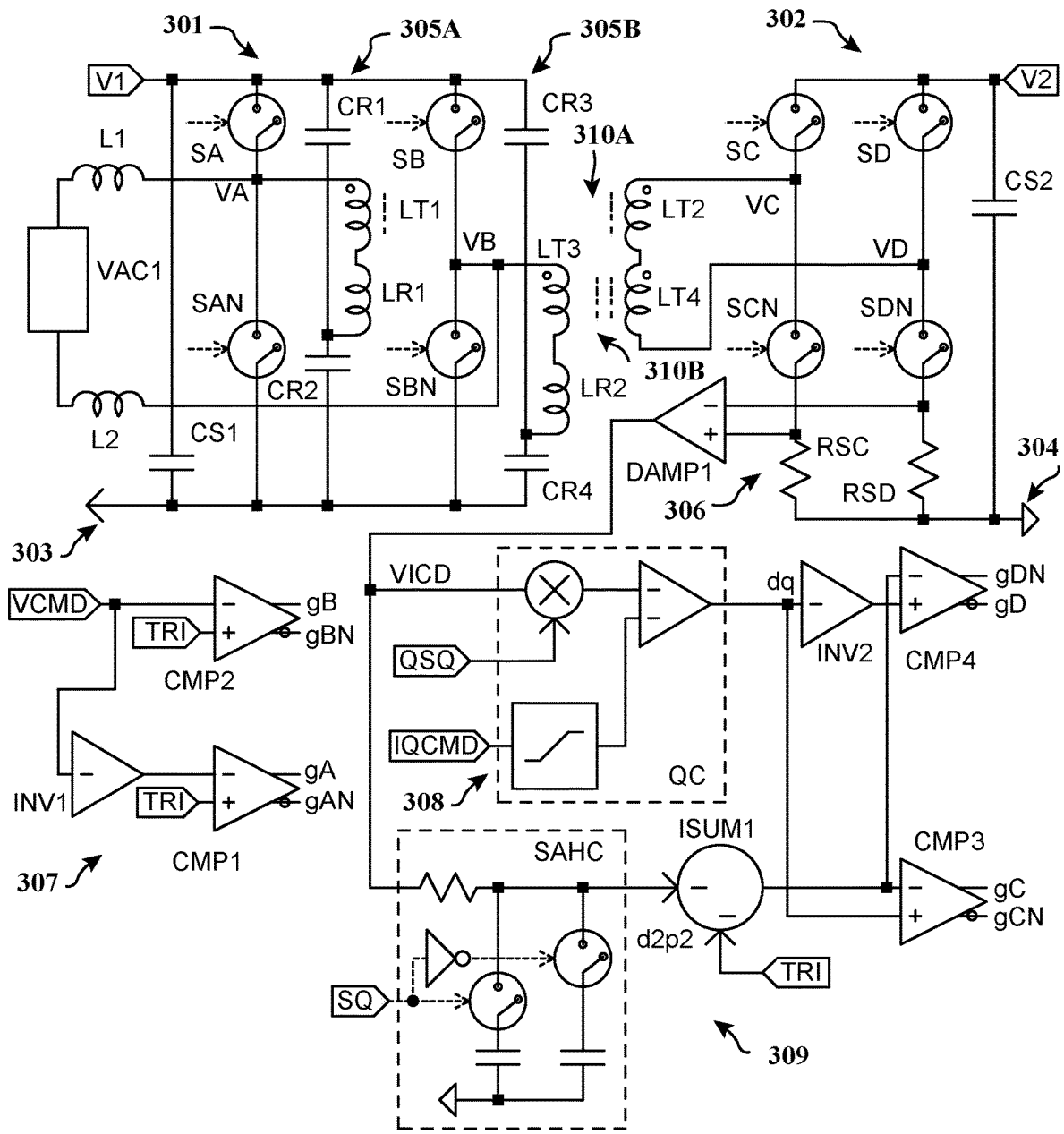
FIG. 3 illustrates a schematic of a synchronous quadrature current controlled resonant power converter comprising a voltage mode line connection and quadrature control of harmonic current between a first and second voltage bus in a single stage according to one or more embodiments shown and described herein.

A voltage line connected embodiment of a synchronous quadrature current controlled resonant power converter is shown in FIG. 3. The description of the power converter begins with a discussion of numbered sections, continues with a detailed description of elements in each section, and then follows with a mathematical description of system operation and signals. The description concludes with a second illustrated embodiment (FIG. 12) which allows for a current controlled line connections and uses a similar mathematical mechanism of system operation. The embodiment shown in FIG. 3 illustrates a line connected voltage controlled bridge (301) which is coupled through a resonant network (305A and 305B) by a transformer (310A and 310B) to a current controlled bridge (302). The transformer provides isolation between a first voltage bus V1 referenced to a first potential (303) and a second voltage bus V2 referenced to a second potential (304). A bridge current sensor (306) drives a signal proportional to the current across bridge nodes, VC and VD, to a synchronous average harmonic current (SAHC) compensator and a quadrature current (QC) compensator which drives a duty cycle input to the SAHC controlled pulse width modulation (309) process. The SAHC compensator superimposes feedback using non-modulated and modulated signals to control differential low frequency bridge current using a duty cycle command and synchronous high frequency bridge current using a phase command respectively. SAHC control results in a linearized dynamic relationship between the first and second bus voltages respectively with minimized reactive (square wave synchronous) current. QC control results in harmonic current transferred between the bridges, as estimated by modulating the bridge current signal by a synchronous quadrature square wave to track a quadrature current command. Estimated harmonic current, shown as an internal variable in FIG. 6, is a linearized control feedback variable relative to duty cycle input using the SAHC controller, and is suitable for limiting switch safe operating area proportional to current stress. The first and second voltage bus may be regulated relative to one another by commanding quadrature current which results in harmonic current transfer. A duty cycle command VCMD to a pulse width modulation stage (307) drives the voltage controlled bridge (301) to produce a signal proportional to the duty cycle and first bus voltage at the bridge terminals (VA and VB) across the line connected voltage (VAC).

The voltage controlled bridge (301) shown in FIG. 3 is further comprised of switching elements connected to a transformer (310A and 310B) through a resonant network (305A and 305B) and a line voltage (VAC1) through series inductors. Sets of complementary switches, SA and SAN, SB and SBN, control voltage at nodes VA and VB respectively. The complementary switches are driven according to the state of the art by respective gate signals, gA and gAN, and gB and gBN in continuous conduction with appropriate dead time to reduce cross-conduction. The complementary switches are implemented according to the state of the art to minimize on switching and conduction losses, for example using SICFETS, GANFETs, MOSFETs, or IGBTs. The switches may have explicit or implicit diodes from source to drain. The voltage controlled bridge transfers power between an energy storage capacitor CS1, and line voltage VAC (through filter inductors L1 and L2), and across a resonant impedance and isolation transformer. An isolation transformer (310A and 310B) is further comprised of paired inductances, LT1 and LT2, and LT3 and LT4 which are respectively magnetically coupled. The inductive elements coupled to the voltage controlled bridge are arranged with series resonant impedances. LT1 is in series with resonant inductor LR1 and paralleled resonant capacitors CR1 and CR2. LT3 is in series with resonant inductor LR2 and paralleled resonant capacitors CR3 and CR4. One or both of the resonant network inductive elements shown (LR1, LR2) may be formed partially or fully by the stray magnetic leakage element of a transformer (such as exists with air gapped inductors or "wireless power transfer" applications).

A voltage command drives a pulse width modulation (PWM) process (307) to generate gate signals of the voltage controlled bridge, including gA, gAN, gB, and gBN. The PWM process is further comprised of an analog inverting amplifier, INV1, and comparators, CMP1 and CMP2. A voltage command (VCMD) is compared to a triangle waveform (TRI) by CMP2 to generate gate signal gB and its complement gBN. The voltage command is inverted, using INV1, and compared to the triangle waveform by CMP1 to generate gate signal gA and its complement gAN. The gate signals, gA and gB, have opposing duty cycles to generate a net line voltage, VAC, with differential cancellation of the first harmonic across the line. The switching nodes, VA and VB, are connected to transformer elements in a manner which results in the first harmonic constructively transmitting isolated power. The embodiment shown in FIG. 3 results in reduced switching harmonic content across the line connected voltage which can reduce material volume required for inductive filtering. Alternate embodiments reduce parts complexity, for example by converting the VB node to a capacitive half-bridge or setting gate signal gB equal to gAN and connecting simplified transformer and resonant network elements between nodes VA and VB.

The current controlled bridge (302) shown in FIG. 3 is further comprised of switching elements driving nodes VC and VD which switch bus voltage V2 to impress a voltage across an isolation transformer. Voltage is applied directly to the isolation transformer in this embodiment, but the resonant network may be reflected across the transformer connection without loss of generality. Complementary switches SC and SCN drive node VC, and complementary switches SD and SDN drive node VD. An energy storage capacitor, CS2, located near the bridge provides a local return path for high frequency currents. Respective complementary switches are driven by gate signals, gC, gCN, gD and gDN according to the state of the art with appropriate timing to reduce cross conduction. Switches are implemented according to the state of the art, with SICFET, GANFET, or MOSFET or other technologies selected according to preference in balance with cost and switching losses. A bridge current sensor (306) is implemented using shunt resistors, RSC and RSD in series with sources of SCN and SDN respectively, and a differential amplifier, DAMP1. The bridge current signal, VICD, is a voltage related to the current flowing between nodes VC and VD.

The bridge current signal drives a synchronous average harmonic current controlled pulse width modulation process (309) and a quadrature current (308) compensator which drives a duty cycle input. The SAHC compensator process synchronously filters and compensates the bridge current signal using a switched capacitor filter which is further described in FIG. 4A. The output of the SAHC compensator is d2p2, which is a voltage signal that superimposes a non-modulated differential duty cycle command and a modulated phase command. The SAHC controlled PWM process (309) is comprised of the described SAHC compensator and the pulse width modulation components, comparators CMP3 and CMP4, which compare the inverted sum (using ISUM1) of SAHC compensator output (d2p2) and a synchronous triangle waveform (TRI) with a duty cycle command (dq). The quadrature current (QC) controller (FIG. 3—308, FIG. 5) generates the duty cycle command to track a commanded current, IQCMD.

Figure 4A:
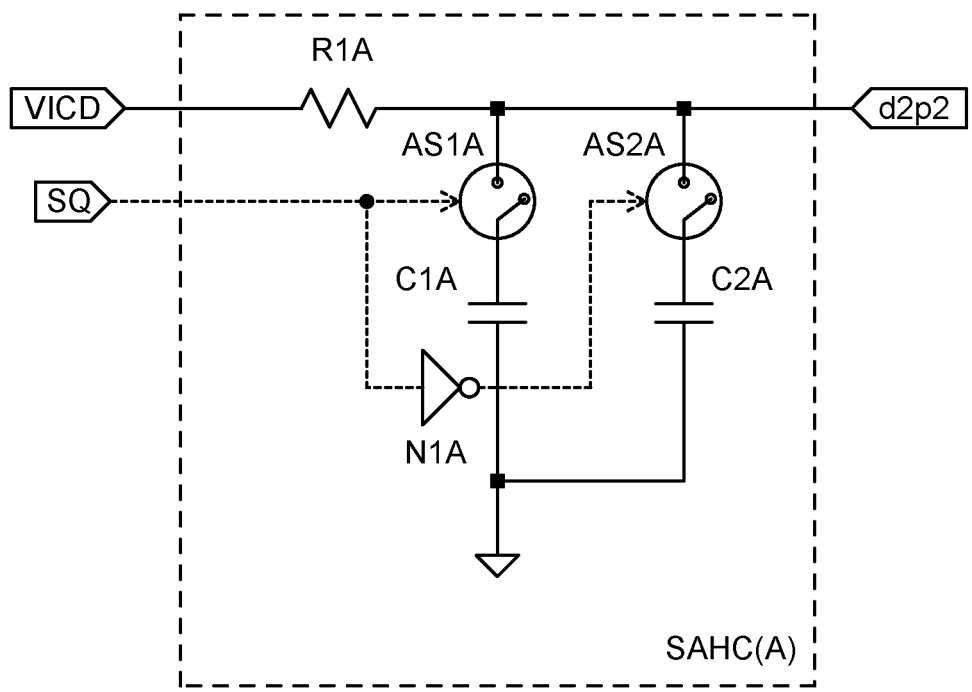
FIG. 4A illustrates a schematic of a non-inverting embodiment of a synchronous average harmonic current compensator according to one or more embodiments shown and described herein.
Figure 4B:
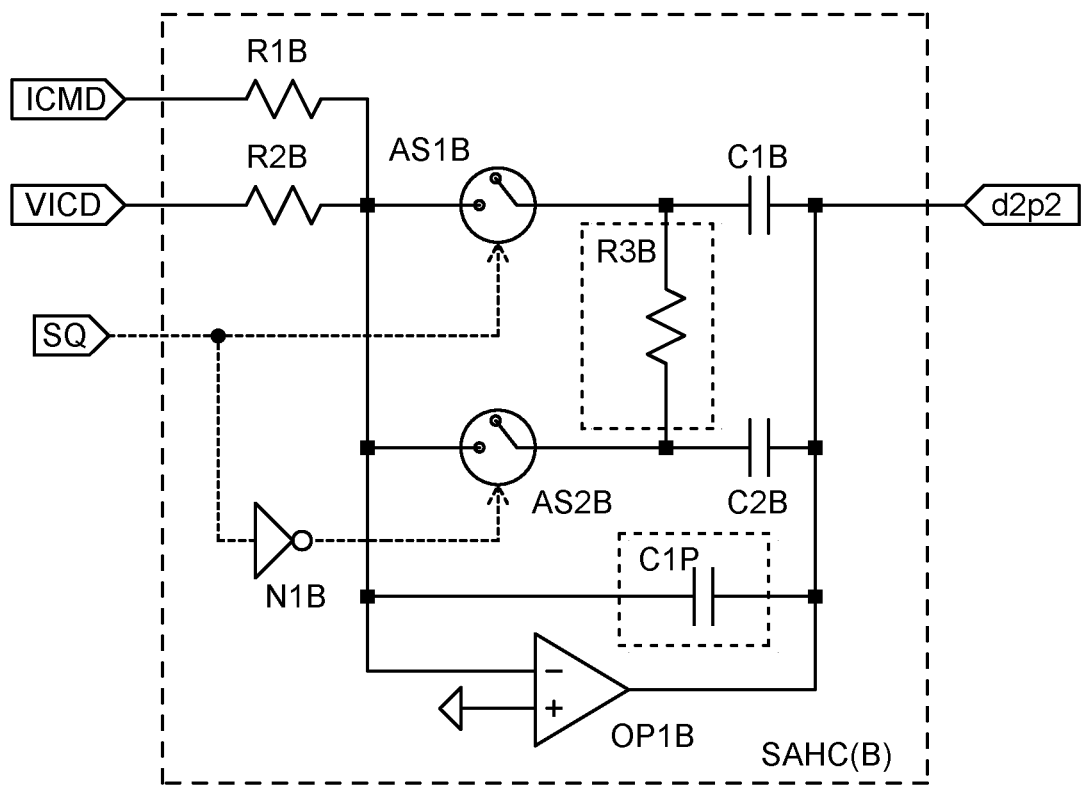
FIG. 4B illustrates a schematic of an inverting embodiment of a synchronous average harmonic current compensator according to one or more embodiments shown and described herein.
Figure 12:
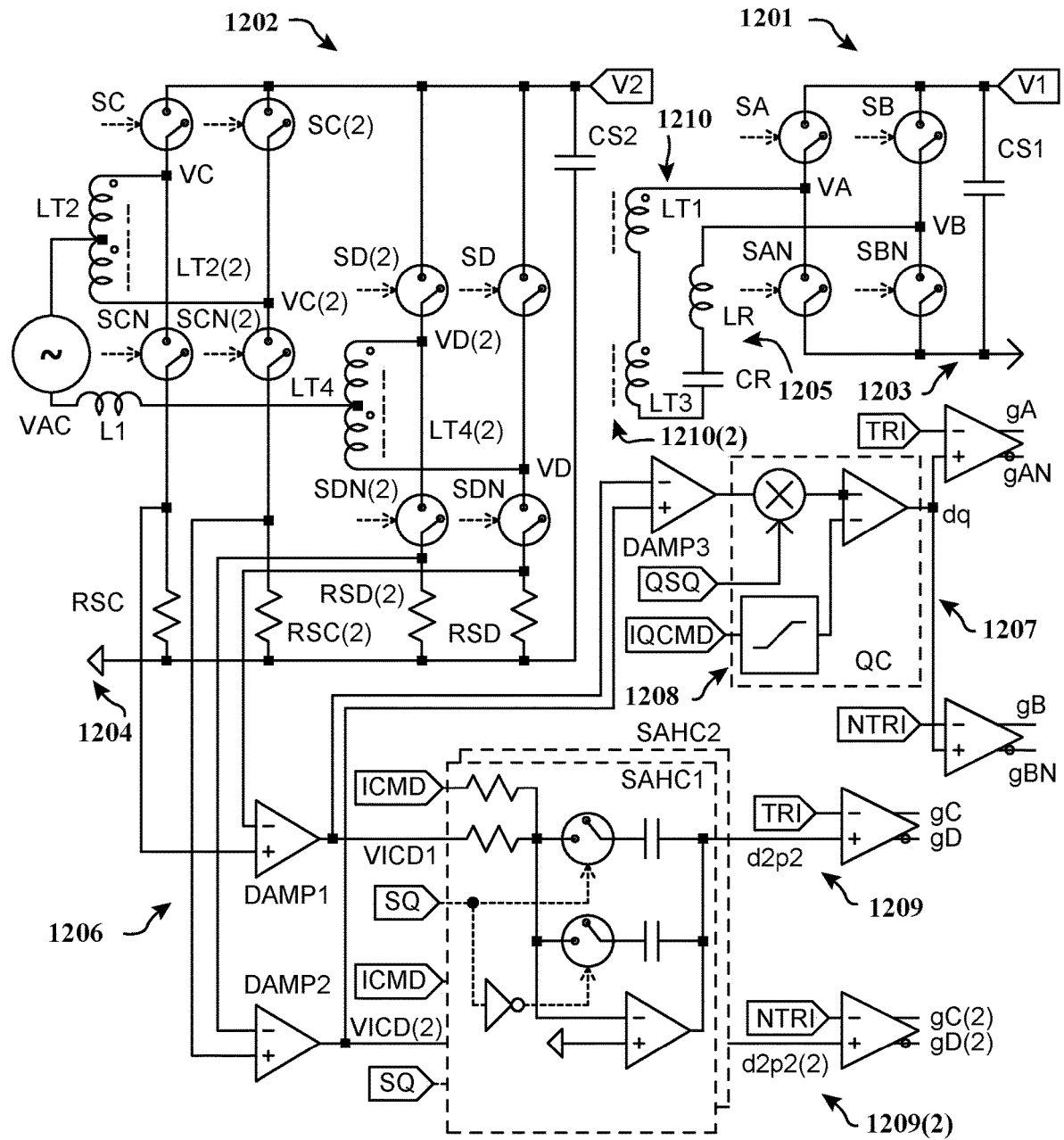
FIG. 12 illustrates a schematic of a synchronous quadrature current controlled resonant power converter comprising a current mode line connection and quadrature control of transferred current between a first and second voltage bus in a single stage according to one or more embodiments shown and described herein.

Non-inverting and inverting forms of switched capacitor filter circuits used for synchronous average harmonic current compensation are illustrated in FIG. 4A and FIG. 4B respectively. The non-inverting form, SAHC(A), shown in FIG. 4A is appropriate for application to minimize synchronous average harmonic current as shown in FIG. 3. The inverting form, SAHC(B), shown in FIG. 4B is appropriate for tracking of commanded synchronous average harmonic current such as is shown in FIG. 12 where the low frequency bridge current tracks commanded current. The non-inverting switched capacitor filter implemented in FIG. 4A has inputs of sensed bridge current, VICD, a synchronous square wave, SQ, and outputs a superimposed duty cycle and phase command, d2p2. The non-inverting filter is further comprised of a resistor, R1A, and switched capacitors, C1A and C2A, which are switched using normally open analog switches, AS1A and AS2A, driven by the synchronous square wave input with one switch inverted using N1A. The switches may be implemented according to the state of the art for example using JFET or CMOS analog switch integrated circuits with built in normally open/normally closed drive circuitry. The resistor and switched capacitors form a superimposed non-modulated and modulated filter with a frequency constant given by the nominal capacitance value and double the resistance. The capacitors are alternately switched into the circuit and sampled to generate the output signal, d2p2, which encodes a duty cycle command as the common (non-modulated) signal over each half period average and a phase command as a difference (modulated) signal over each half period average.

The inverting switched capacitor filter shown in FIG. 4B may be used to form a synchronous average harmonic current compensator which tracks a reference current command. The compensator, SAHC(B), is further comprised of resistors R1B and R2B, switched capacitors C1B and C2B, analog switches AS1B and AS2B, inverting logic gate N1B, and inverting opamp OP1B. Additionally, the compensator SAHC(B) may optionally include components such as R3B and C1P to tune frequency dependent loop gain and op-amp stability respectively. The compensator uses inputs representing commanded current ICMD, sensed bridge current VICD, and a synchronous square wave SQ, in order to generate a superimposed duty cycle phase command d2p2.

The opamp OP1B, is selected according to the state of the art to have wide bandwidth and high slew rate to approximately impose a virtual ground node at its inverting input terminal. Resistors, R1B and R2B, act to sum current into the opamp inverting input proportional to the bridge current signal, VICD, and commanded current, ICMD. Analog switches, AS1B and AS2B, alternately connect C1B and C2B respectively into the opamp feedback path such that input current flows through the respective capacitors over each half period synchronous with SQ. The analog switches are implemented according to the state of the art, for example by using CMOS or JFET switch integrated circuits with complementary normally open and normally closed switches. The switched capacitors integrate the error current signal synchronously over each half period as defined by the input square wave, SQ. The signal, d2p2, sampled onto the output of OP1B represent superimposed non-modulated and modulated compensator paths whereby a duty cycle command is represented by a common (non-modulated) signal, and a phase command is represented by a difference (modulated) signal over each sampled half period average. The compensator integrates the error current signal with a frequency constant given by the switched capacitor value and double the resistor value. Both the modulated and non-modulated compensator paths may be altered by placing independent components in parallel with each switched capacitor, C1B and C2B. The modulated compensator path may be altered without impacting the non-modulated path by placing a component, such as a resistor or resistor capacitor combination, in position of R3B. A component in parallel with the opamp input and output, such as C1P, may be used to affect stability and noise of the opamp compensator.

Figure 5:
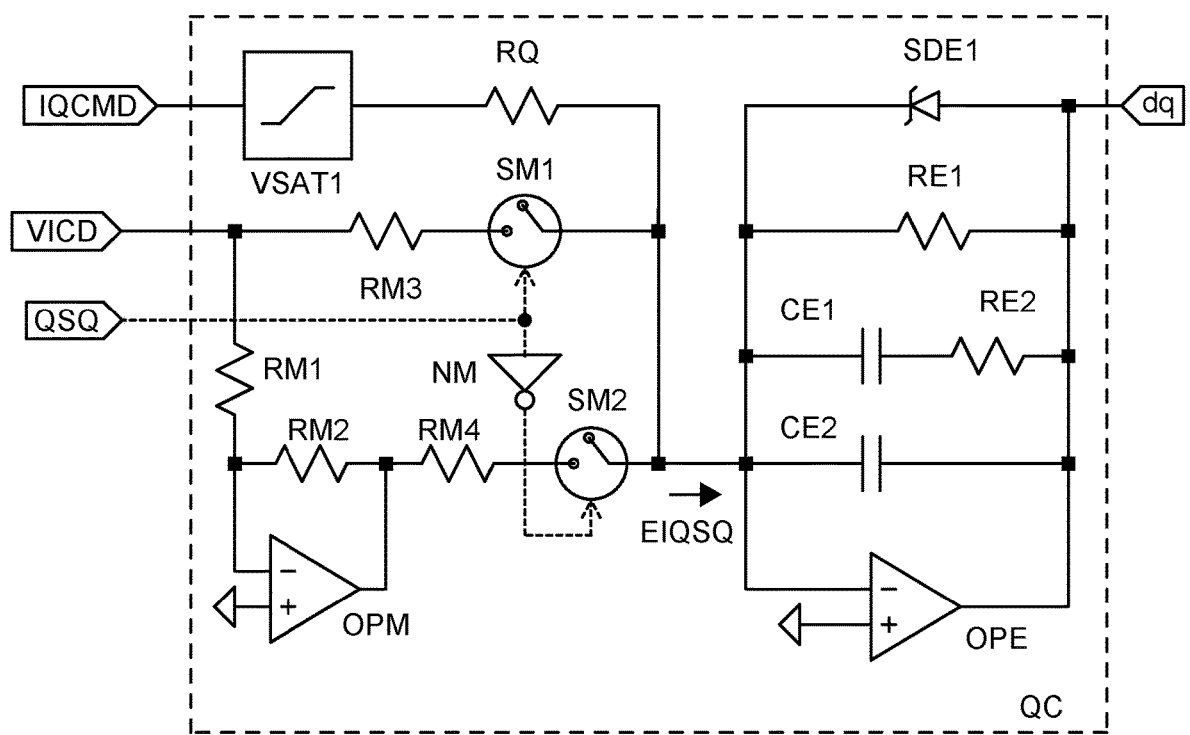
FIG. 5 illustrates a schematic of an inverting quadrature current compensator filter according to one or more embodiments shown and described herein.

FIG. 5 illustrates an embodiment of a quadrature current (QC) compensator, similar to the compensator block (308) shown in FIG. 3. The QC compensator has inputs of sensed bridge current VICD, quadrature current command IQCMD, and a synchronous quadrature square wave QSQ. The quadrature current compensator is comprised of elements which perform synchronous signal multiplication (RM1, RM2, RM3, RM4, OPM, SM1, SM2), command a limited current (VSAT1, RQ), and compensate error current (OPE, CE2, CE1, RE1, RE2, SDE1) to feedback on a duty cycle, dq. A signal proportional to quadrature current command and estimated quadrature current is summed into the virtual node given by the inverting terminal of the opamp, OPE. Quadrature current is estimated by multiplying the bridge current signal, VICD, by a quadrature square wave, QSQ. By definition, the quadrature square wave is the 90 degrees phase delayed relative to the synchronous square wave which drives the SAHC compensator. Multiplication is performed by switches, SM1 and SM2, synchronized by the quadrature square wave which alternately drive resistor currents (through RM3 and RM4) proportional to a positive and negative constant. Alternate analog multiplication methods exist for those skilled in the art (such as analog multiplying voltage ICs), with the method illustrated in FIG. 5 selected for cost, charge and impedance balancing. Commanded quadrature current is limited by a clipping component, VSAT1, and sums onto the opamp inverting node through resistor RQ to form the sum inverting error current, EIQSQ. Examples of clipping methods known to those skilled in the art include applying rail to rail opamp output, or application of diodes to threshold values. The error current, EIQSQ, is driven through the compensation components (RE1, RE2, CE1, CE2) between the inverting terminal and output of the opamp (OPE) which implements integration, low pass and lead-lag filtering according to methods known to the start of the art. A Schottky diode, SDE1, limits the output duty cycle, dq, to avoid sign inversion of the feedback signal.

A model is illustrated in 6A which describes the systematic behavior of a voltage line connected synchronous quadrature current controlled (VLC-SQCC) resonant power converter embodiment (such as FIG. 3). The synchronous average harmonic current compensator and quadrature current compensator embodiments illustrated in FIG. 4 and FIG. 5 work together to result in a bidirectional isolated harmonic voltage buck boost converter with controlled current transfer. The interfacing terminals of a voltage controlled bridge (301, FIG. 3) including, V1, VA, VB, and RTN1, are illustrated on the left edge of FIG. 6A. The voltage controlled bridge includes a line connection to VAC1 between terminals VA and VB, and an energy storage capacitor (CS1) between a DC voltage bus (V1) and a return (RTN1). The interfacing terminals of a current controlled bridge (302, FIG. 3) including V2, RTN2A and RTN2B are illustrated on the right edge of FIG. 6A. The current controlled bridge has an energy storage capacitor (CS2) connected between a DC voltage bus (V2) and returns (RTN2A and RTN2B). The FIG. 6A signal level blocks, PWM, QC(A) and SAHC(A) represent the voltage commanded PWM input section (307) and quadrature and synchronous average harmonic current compensators illustrated in detail in FIG. 4A and FIG. 5 respectively. Respective signal interfaces are shown along the bottom edge of FIG. 6A including commanded bridge voltage VCMD, and commanded harmonic transfer current IQCMD, and the synchronization and modulation waveforms QSQ, SQ and TRI. A mathematical description of the system dynamics resulting from the PWM, QC(A) and SAHC(A) blocks is developed in the following section, and summarized using internal operators VMULT1, VMULT2, IMULT1, IMULT2. The output of VMULT1 represents linearized primary harmonic voltage, and the output of VMULT2 represents linearized secondary harmonic voltage. The dynamic behavior shown by VMULT1, VMULT2, and LQSQ results from linearization due to the synchronous average harmonic current controller, and the resulting power balance is given by IMULT1 and IMULT2. The internal current sources, I1 and I2 describe power transfer between voltage buses as a result of dynamic control behavior. The internal voltage source, VAB, results from the voltage command, VCMD, pulse width modulating the voltage bus, V1. Current transfer between VAB and the bus is developed according to the state of the art and is omitted for brevity. As a result of the synchronous average harmonic current controller, a current IQSQ flows between the buses across the effective inductor LQSQ in proportion to harmonically weighted voltages. The harmonic current is an internal variable which is estimated, controlled and limited using the quadrature current controller. The quadrature current controller linearizes current flow about an estimated internal current signal degree of freedom, resulting in stable dynamic feedback behavior and controlled current sharing between one or more modules. Multiple VLC-SQCC power converter modules may be connected together and clocked using multiple phases of quadrature and square waveforms generated according to the state of the art to result in harmonic reduction. Example configurations include series voltage buses (V2) or paralleled output using current sharing given quadrature current commands (IQCMD). Voltage controlled line connections (VAC1) for multiple modules may be connected in series to increase overall voltage and reduce harmonics.

A model is illustrated in 6B which describes the systematic behavior of a current line connected synchronous quadrature current controlled (CLC-SQCC) resonant power converter embodiment illustrated in FIG. 12. The interfacing terminals on the left side of FIG. 6B include representative connections of a current controlled bridge (FIG. 12, 1202) including V2, VC, VD, RTN2A and RTN2B. An energy storage capacitor CS2 is placed across a DC bus V2 and return connections RTN2A and RTN2B. The embodiment shown in FIG. 6B applies a current (ICD) driven connection to a line voltage, VAC2. The interfacing terminals on the right side of FIG. 6B include representative connections of a voltage controlled bridge (FIG. 12, 1201) including V1 and RTN1. An energy storage capacitor CS1 is placed across DC bus V1 and return connection RTN1. The model elements given by VMULT2, VMULT1, and LQSQ result from dynamic linearization using the synchronous average harmonic current controller (SAHC(B)). The output of VMULT1 represents linearized primary harmonic voltage, and the output of VMULT2 represents linearized secondary harmonic voltage. The current sources, I2 and I1, calculated using IMULT2 and IMULT1 preserve harmonic power. The SAHC(B) controller superimposes multiple feedback paths in the modulated and non-modulated signal to linearize harmonic behavior and track a commanded current reference, ICMD. The power transfer between ICD and bus voltage V2 is not shown directly in this figure, and is calculated according to the state of the art. The internal quadrature current degree of freedom, IQSQ, represents linearized harmonic current transfer which is estimated and controlled on by the quadrature current compensator (QC (B)). A quadrature current command facilitates current sharing of multiple parallel converters, which may be shaped based on harmonic voltage. Multiple phases of square and quadrature waveforms may be used to clock multiple modules together for power sharing and harmonic cancellation. The quadrature current controller allows for parallel connection of multiple V2 bus voltages, and the synchronous average harmonic current controller allows for parallel connection of multiple modules to the same line voltage (VAC2) and bus voltage (V2).

Auxiliary transformer windings may be coupled to the bridge voltage VCD to construct auxillary power supplies. Examples of auxiliary bridges with high AC impedance (which share gracefully with SAHC control) include passive bridge rectifiers with inductor elements in series with their auxiliary bus voltage and capacitance, and active regulated inductive phase shift bridge rectifiers.

Figure 6A:
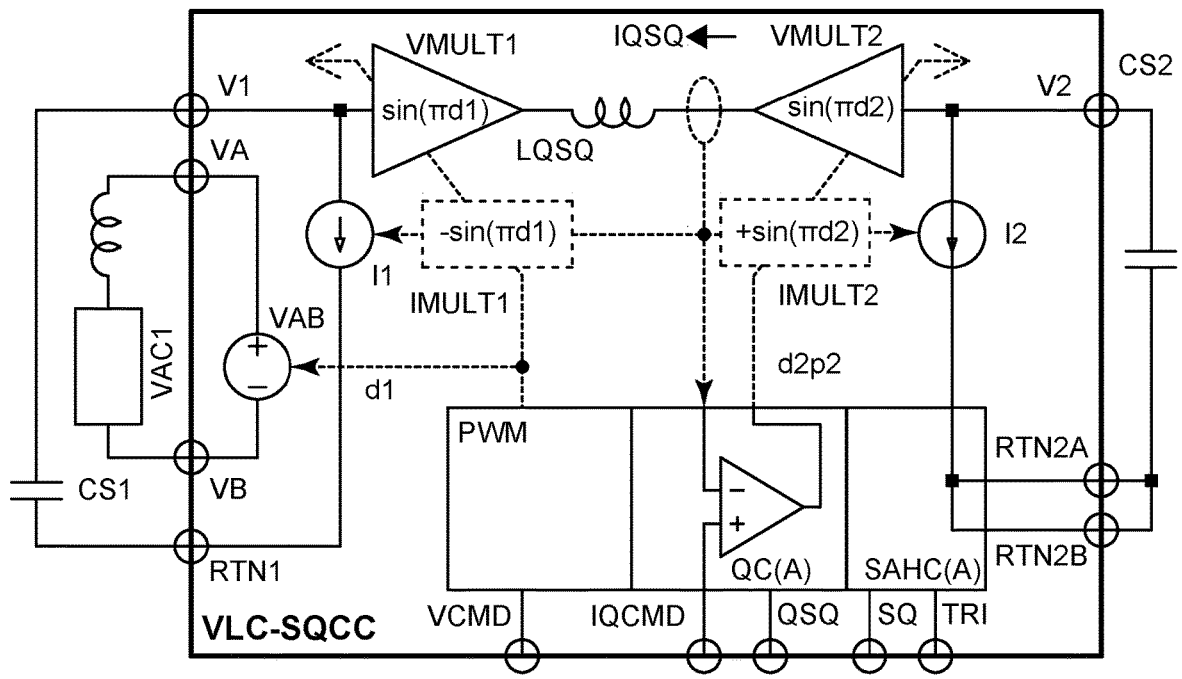
FIG. 6A illustrates a model of a synchronous quadrature current controlled resonant power converter with a voltage controlled line connection according to one or more embodiments shown and described herein.
Figure 6B:
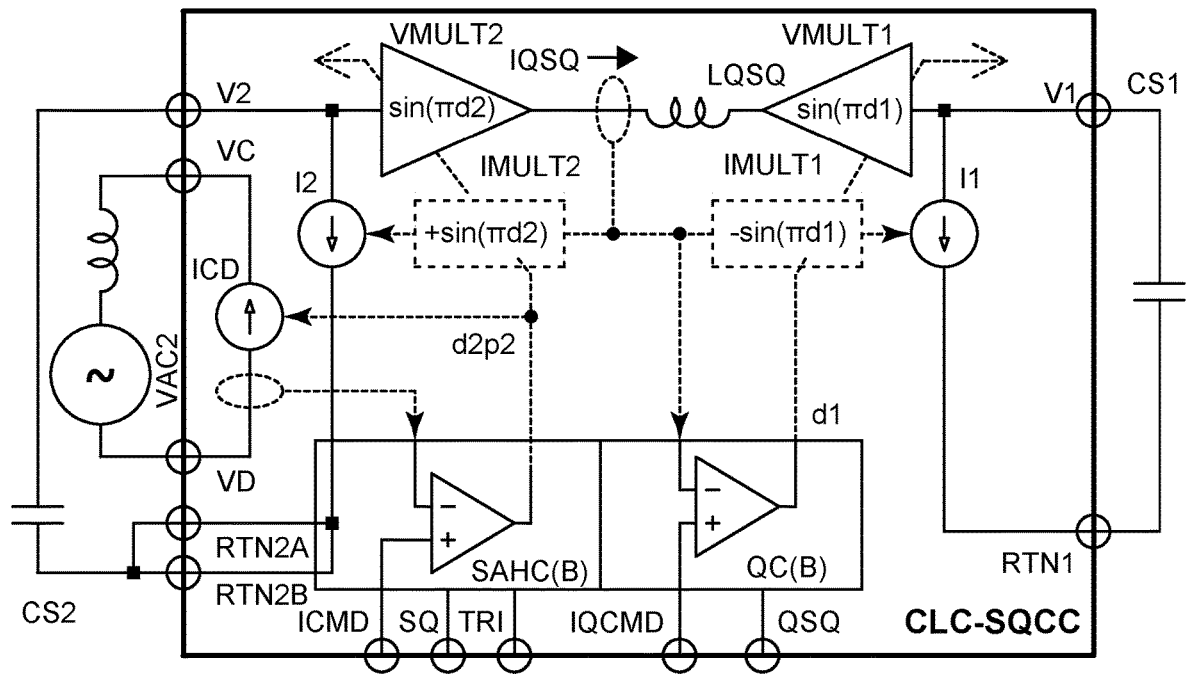
FIG. 6B illustrates a model of a synchronous quadrature current controlled resonant power converter with a current controlled line connection according to one or more embodiments shown and described herein.

A DC-DC converter with general buck-boost regulation may be synthesized from FIG. 6A or FIG. 6B by opening the line connection which allows the associated bridge duty cycle to be a free degree of freedom for buck regulation. The corresponding isolated bridge may be commanded with a complementary duty cycle input for boost regulation such that the combined system has buck-boost regulation. The bucking duty cycle and boosting duty cycle may be generated according to the feedback signal from the associated quadrature current compensator.

Figure 7A:
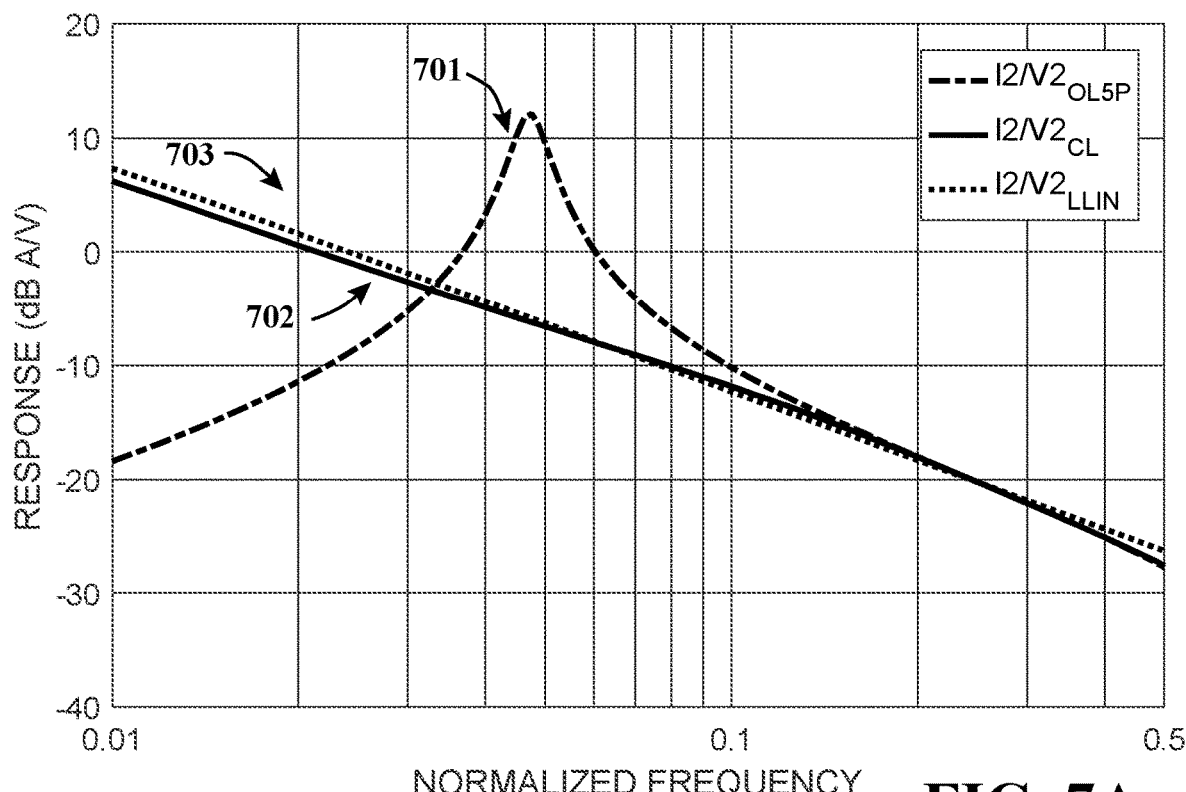
FIG. 7A shows an example of open loop and closed loop bus current due to bus voltage perturbation versus frequency for a resonant power converter according to one or more embodiments shown and described herein.
Figure 7B:
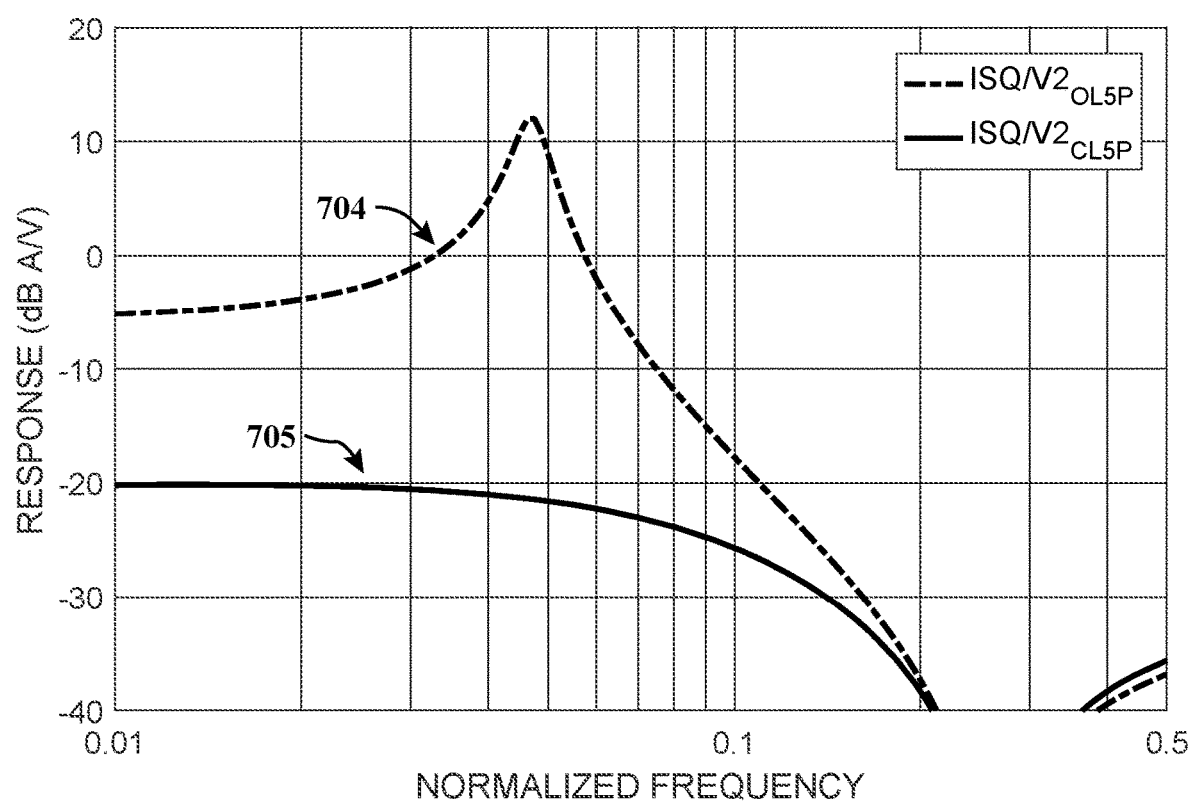
FIG. 7B show an example of open loop and closed loop reactive current, or isolation transformer recirculating current due to voltage perturbation versus frequency, for a resonant power converter according to one or more embodiments shown and described herein.
Figure 8A:
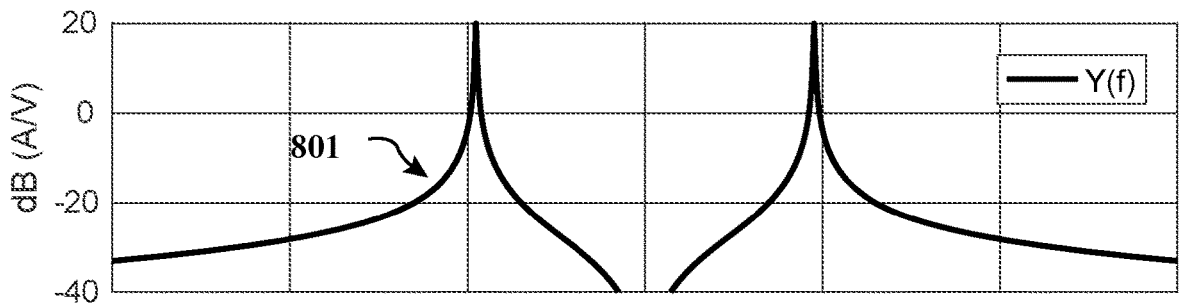
FIG. 8A shows an example calculation of admittance, or inverse of impedance, for a resonant network according to one or more embodiments shown and described herein.
Figure 8B:
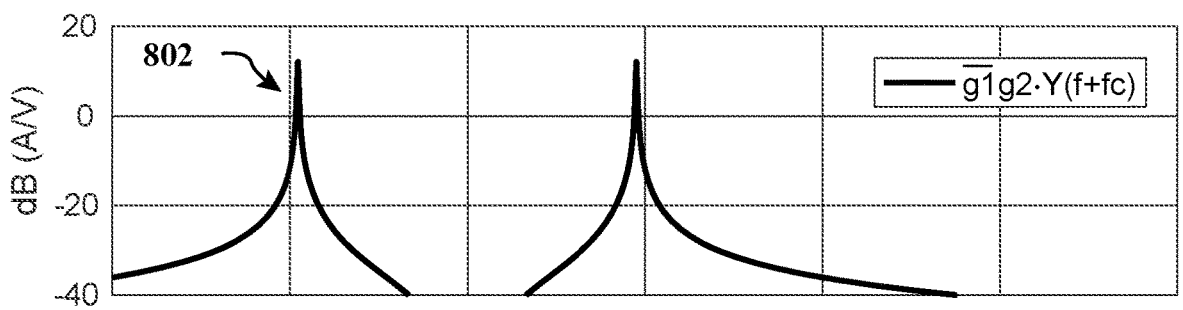
FIG. 8B shows an example calculation of admittance due to a positive frequency modulation term, according to one or more embodiments shown and described herein.
Figure 8C:
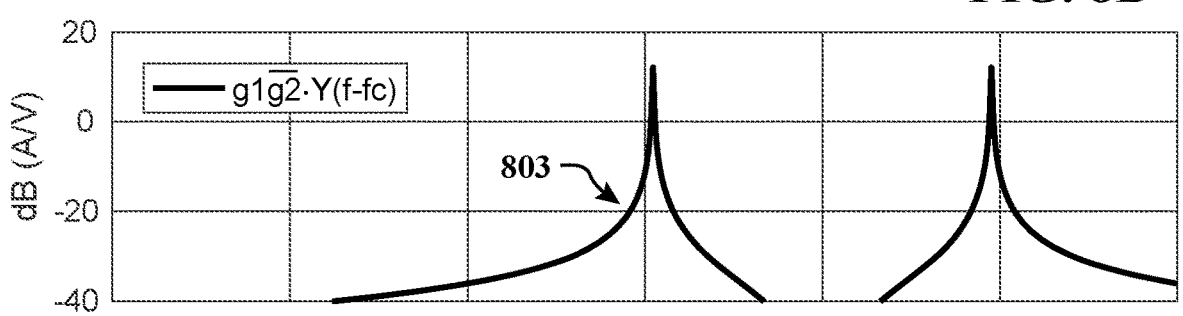
FIG. 8C shows an example calculation of admittance due to a negative frequency modulation term, according to one or more embodiments shown and described herein.
Figure 8D:
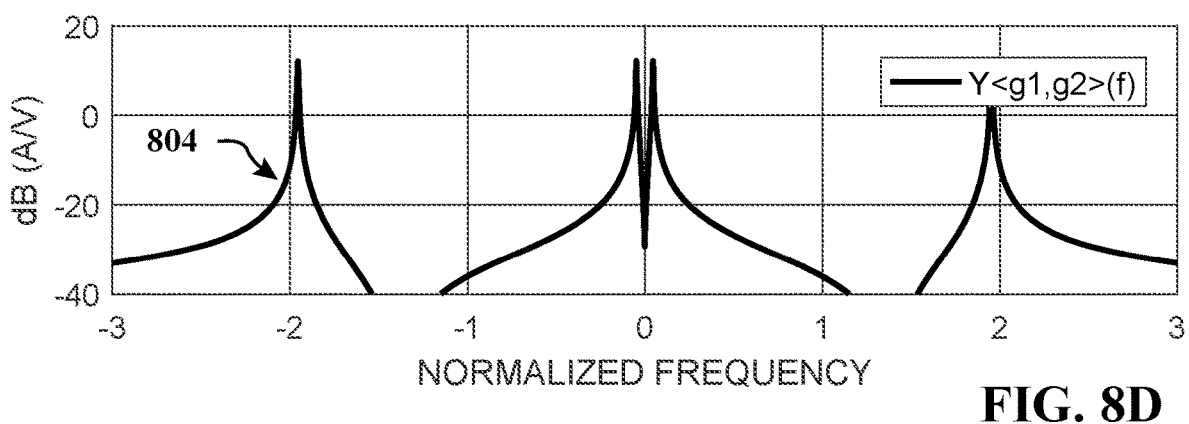
FIG. 8D shows an example calculation of a first harmonic approximation of modulated admittance due to the sum of the positive and negative modulation terms (FIGS. 8B and 8C), according to one or more embodiments shown and described herein.

Embodiments of the synchronous average harmonic current controller illustrated in FIG. 6A and FIG. 6B linearize the harmonic voltage coupling admittance (or inverse of impedance) of a resonant power converter. Example electrical admittance (or the I2 current response due to V2 bus voltage excitation versus normalized frequency) is illustrated FIG. 7A for an embodiment of a resonant power converter with a small (5%) tuning difference between the switching frequency and resonant network natural frequency. The open loop response (701—I2/V2_OL5P) has highly variable frequency dependent admittance, in contrast to an inductive phase shift power converter (101B) which has ideally low admittance (apparent current source), or a buck boost converter (201) which has ideally high admittance at low frequencies (apparent voltage source). The closed loop power system response (702—I2/V2_CL) benefits from synchronous average harmonic current control to approximate admittance of a linear inductor (703—I2/V2_LLIN). The corresponding square wave demodulated (reactive) bridge current response (ISQ) due to bus voltage excitation (V2) is illustrated in FIG. 7B. The open loop response (704—ISQ/V2_OL5P) exhibits a lightly damped resonant peak near 5% of the normalized switching frequency due to the 5% tolerance between the switching frequency and resonant network frequency. The closed loop response (705—ISQ/V2_CL5P) is attenuated relative to the open loop response which results in reduced reactive current and lower conduction losses. The mathematical mechanism by which the synchronous average harmonic current controlled resonant power system rejects square wave synchronous current and linearizes the system is further derived in the following numbered equations leading toward the descriptive behavior in EQ11.

An embodiment of a synchronous quadrature current controlled resonant power converter is described here using linearized harmonic vector and scalar first switching harmonic approximations. The mathematical discussion illustrates relevant notation and develops results for the embodied control systems. A pulse width modulation process transforms commanded phase and duty cycle signals encoded in the modulated and non-modulated reference frame respectively to result in a logical gate signal ($\vec{g}_A$) given in the time and frequency domain:

$$\vec{g}_{A,f} = \mathcal{F} \cdot \vec{g}_{A,t} = \mathcal{F} \cdot \text{PWM}(d_1, \varphi_1, \text{TRI}) \qquad \text{EQ1}$$

where $\vec{g}_{A,t}$ is a logical gate signal vector for switch SA over a periodic block of time (subscript $t$), and $\vec{g}_{A,f}$ is a conjugate symmetric vector representing the gate signal in the frequency domain (subscript $f$). The Fourier transform matrix, $\mathcal{F}$, projects between a time vector and a symmetric (double-sided) frequency vector. The time domain gate signal, $\vec{g}_{A,t}$, is a function of a pulse width modulation (PWM) process which has arguments of duty cycle, $d_1$, phase, $\varphi_1$, and a triangular waveform, TRI. The process is described mathematically for a first set of arguments ($d_1$, $\varphi_1$) corresponding to a first switch (SA), and can be calculated for other switching nodes by substituting input arguments.

Steady state harmonic content of a pulse width modulation process with commanded duty cycle, $d_1$, and phase, $\varphi_1$, is given by:

$$\vec{g}_{A,k} = \frac{\sin(d_1 k \pi)}{k \pi} \cdot e^{(-2\pi i k \varphi_1)} \qquad \text{EQ2}$$

where the subscript k is the integer harmonic relative to the switching frequency, $f_c$. A differential gate signal, $\vec{g}_{AB}$, represents the difference of gate signals, $\vec{g}_A$ and $\vec{g}_B$, used to modulate the first bus voltage (V1). Examples of methods to generate the subtracted gate signal $\vec{g}_B$ for switch SB, include modulation with an anti-phase or inverted argument, logically complementing $\vec{g}_A$, or using a capacitive half-bridge which blocks the DC component of $\vec{g}_A$. A similar process is used to generate $\vec{g}_{CD}$ which is used to modulate the second bus voltage (V2) with appropriate arguments for switches SC and SD. Different combinations of pulse width modulation arguments are utilized for gate signals in one or more illustrated embodiments including: a common or differential duty cycle and a common or differential first switching harmonic across bridge switching nodes. Transformer elements are arranged with an appropriate coupling direction to reproduce derivations which assume a difference between two gate signals reinforces the first switching harmonic.

Frequency dependent current $\vec{I}_{AB,f}$ flowing between bridge nodes A and B is modeled assuming continuous conduction:

$$\vec{I}_{AB,f} = \vec{Y}_{R,f} \odot ((\vec{g}_{AB,f} * \vec{V}_{1,f}) - (\vec{g}_{CD,f} * \vec{V}_{2,f})) \qquad \text{EQ3}$$

where current flow results from modulated voltages multiplied by the resonant network admittance, $\vec{Y}_{R,f}$, which is the (element-wise) inverse of the resonant network impedance $\vec{Z}_{R,f}$. The resonant impedance is calculated as the frequency dependent impedance vector resulting from the series network given by inductance, LR, and capacitance, CR. The Hadamard multiply operator, $\odot$, represents the element-wise product of vectors. The voltage across the resonant admittance is given by the convolution of respective gate signals, $\vec{g}_{AB,f}$ and $\vec{g}_{CD,f}$, and bus voltages $\vec{V}_{1,f}$ and $\vec{V}_{2,f}$. The (circular) convolution operator, '*', is the equivalent frequency domain operation to the time domain amplitude modulation given by a gate signal multiplied by a bus voltage.

The current $\vec{I}_{CD,f}$ flowing between bridge nodes C and D is:

$$\vec{I}_{CD,f} = -\vec{Y}_{R,f} \odot (\vec{g}_{AB,f} * \vec{V}_{1,f}) + \vec{Y}_{Lm||R,f} \odot (\vec{g}_{CD,f} * \vec{V}_{2,f}) \qquad \text{EQ4}$$

which results from modulated voltage across respective admittance vectors, $\vec{Y}_{R,f}$ and $\vec{Y}_{Lm||R,f}$. The parallel impedance combination of the resonant impedance network, $\vec{Z}_{R,f}$, and the magnetizing inductance, $\vec{Z}_{Lm,f}$ is given by $\vec{Z}_{Lm||R,f}$ whose inverse is used to calculate $\vec{Y}_{Lm||R,f}$. The magnetizing inductance results in current flow that may be used to bias bridge switches into soft switching at some operating points, or may be used to model an inductively coupled line voltage. Assuming a large magnetizing inductance, the bridge current $\vec{I}_{CD,f}$ converges to be equal and opposite $\vec{I}_{AB,f}$ for a unity turns ratio (or preserves power for an arbitrary turns ratio).

Respective bridge currents are modulated to result in bus current:

$$\vec{I}_{1,f} = \vec{g}_{AB,f} * (\vec{Y}_{R,f} \odot (\vec{g}_{AB,f} * \vec{V}_{1,f})) - \vec{g}_{AB,f} * (\vec{Y}_{R,f} \odot (\vec{g}_{CD,f} * \vec{V}_{2,f})) \qquad \text{EQ5A}$$

$$\vec{I}_{2,f} = -\vec{g}_{CD,f} * (\vec{Y}_{R,f} \odot (\vec{g}_{AB,f} * \vec{V}_{1,f})) + \vec{g}_{CD,f} * (\vec{Y}_{Lm||R,f} \odot (\vec{g}_{CD,f} * \vec{V}_{2,f})) \qquad \text{EQ5B}$$

where $\vec{I}_{1,f}$ is the current flow through the first voltage bus and $\vec{I}_{2,f}$ is the current flow through the second voltage bus.

Current across each bridge, $\vec{I}_{AB,f}$ and $\vec{I}_{CD,f}$, is modulated by taking the convolution product with respective gate signals, $\vec{g}_{AB,f}$ and $\vec{g}_{CD,f}$, to calculate $\vec{I}_{1,f}$ and $\vec{I}_{2,f}$. EQ5A and EQ5B use similar operations, whereby input voltage is convolved by an input modulation gate signal, multiplied by an admittance vector, and convolved by an output modulation gate signal.

The mathematical products developed to calculate EQ5A and EQ5B are concisely summarized using equivalent modulated admittance terms to calculate scalar currents $I_1$ [$f$] and $I_2$ [$f$]:

$$I_1[f] = Y_{(AB,AB)}[f] \cdot V_1[f] - Y_{(AB,CD)}[f] \cdot V_2[f] \quad \text{EQ6A}$$

$$I_2[f] = -Y_{(CD,AB)}[f] \cdot V_1[f] + Y_{(CD,CD)}[f] \cdot V_2[f] \quad \text{EQ6B}$$

where the notation for modulated admittance is expanded in EQ7A and EQ7B. As an example, $Y_{(CD,AB)}$ indicates an input convolution by a gate modulation signal ($\vec{g}_{AB,f}$), a multiplication by an admittance ($\vec{Y}_{R,f}$), and an output convolution by a gate modulation signal ($\vec{g}_{CD,f}$). The current $I_1$ [$f$] indicates current through the first bus at frequency $f$, and the current $I_2[f]$ indicates current through the second bus at frequency $f$. EQ6B may be used to calculate the open loop admittance (701) shown in FIG. 7.

The modulated admittance terms (used in EQ6A and EQ6B) are approximated using the first harmonic of the gate modulation signals at switching frequency. A representative example calculation for modulated admittance is:

$$\vec{Y}_{(CD,AB)} = (\overline{g}_{CD,\,k1} \cdot \overline{g}_{AB,\,k1}) \cdot \vec{Y}_{R,f-fc} + (\overline{g}_{CD,\,k1} \cdot g_{AB,\,k1}) \cdot \vec{Y}_{R,f+fc} \quad \text{EQ7A}$$

$$Y_{(CD,AB)}[f] = (\overline{g}_{CD,\,k1} \cdot \overline{g}_{AB,\,k1}) \cdot \overline{Y}_R[f_c - f] + (\overline{g}_{CD,\,k1} \cdot g_{AB,\,k1}) \cdot Y_R[f_c + f] \quad \text{EQ7B}$$

where the $\vec{Y}_{(CD,AB)}$ is calculated by adding respective negative and positive frequency shifted vectors, $\vec{Y}_{R,f-f_c}$ and $\vec{Y}_{R,f+f_c}$, which are weighted by the conjugate first harmonic weightings, $(\overline{g}_{CD,\,k1} \cdot \overline{g}_{AB,\,k1})$ and $(\overline{g}_{CD,\,k1} \cdot g_{AB,\,k1})$ respectively. The scalar form of EQ7A is shown in EQ7B where conjugate symmetry is used to provide an equivalent expression using only positive frequencies ($Y_R[f-f_c]$ equals $\overline{Y}_R[f_c-f]$). Other modulated admittance terms, including $Y_{(AB,AB)}$, $Y_{(CD,CD)}$, and $Y_{(AB,CD)}$ are calculated using a similar method to EQ7B with input arguments substituted respectively in accordance with similar terms in EQ5A and EQ5B.

An example modulated admittance calculation is illustrated in FIG. 8. FIG. 8A illustrates linear admittance (801), Y[$f$], which is the inverse of an impedance, Z[$f$]. FIG. 8B illustrates the admittance term modulated to result in a positive frequency shift (802), $\overline{g}_1 g_2 Y[f+f_c]$. FIG. 8C illustrates the admittance term modulated to result in a negative frequency shift (803), $g_1 \overline{g}_2 Y[f-f_c]$. FIG. 8D illustrates the modulated admittance term (804), $Y_{<g1,\,g2>}[f]$ calculated using EQ7B.

The synchronous average harmonic current controller reduces error current flow between bridge nodes VC and VD by controlling on the non-modulated (low frequency) current signal and reducing the square wave ($\vec{g}_{SQ,f}$) modulated (reactive) current. A quadrature current controller tracks the quadrature square wave ($\vec{g}_{QSQ,f}$) modulated (transmitted) bridge current to a command, where the quadrature square wave is 90 degrees out of phase relative to the square wave.

Figure 9A:
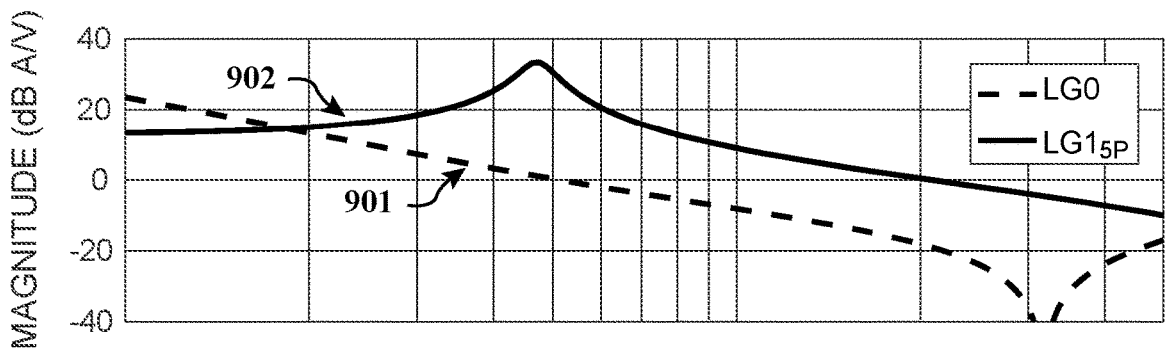
FIG. 9A illustrates an example loop gain magnitude for a non-modulated (low frequency) compensator path and for a synchronously modulated (high frequency) compensator path realized by a synchronous average harmonic compensator according to one or more embodiments shown and described herein.
Figure 9B:
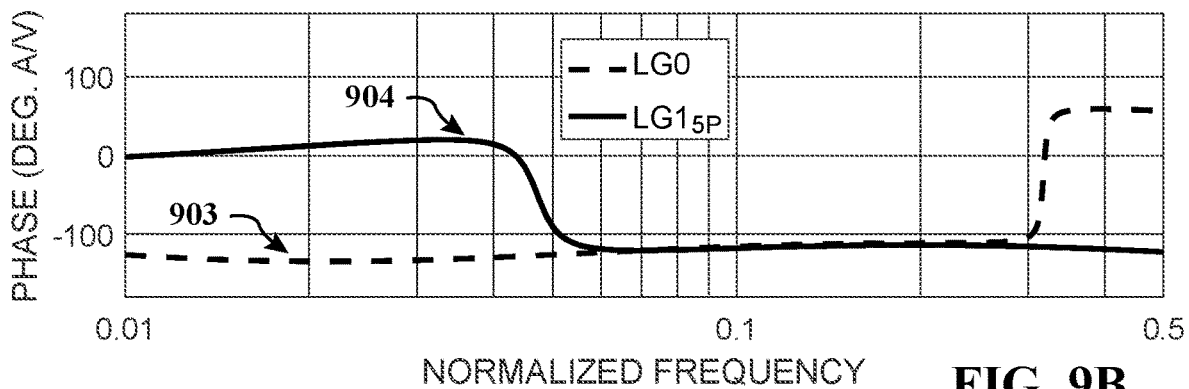
FIG. 9B shows the phase of an example loop gain corresponding to FIG. 9A according to one or more embodiments shown and described herein.
Figure 9C:
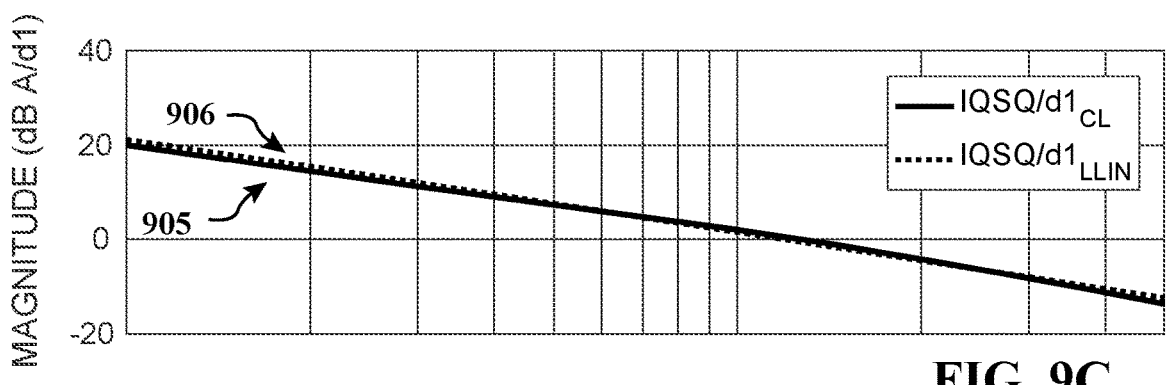
FIG. 9C illustrates an example loop gain magnitude for the quadrature current estimation of linearized harmonic current due to changes in duty cycle, and a linear inductive model approximation according to one or more embodiments shown and described herein.
Figure 9D:
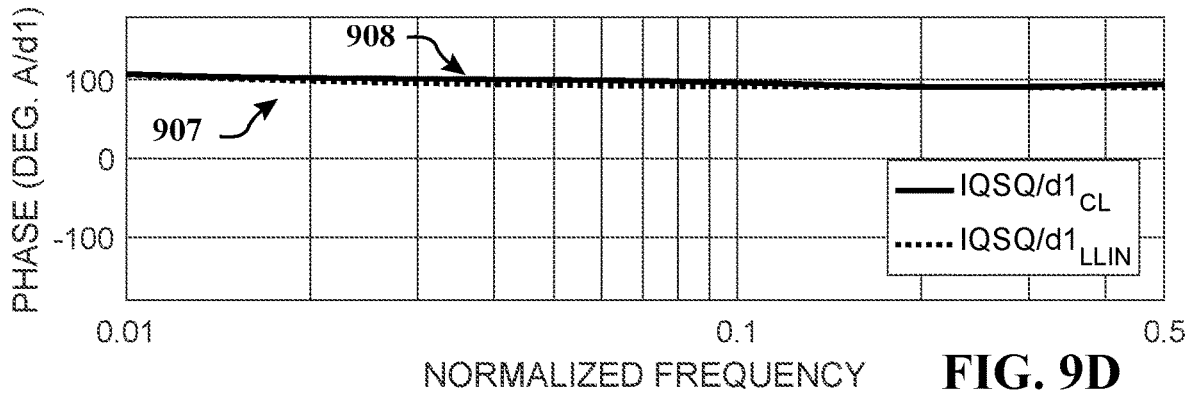
FIG. 9D shows phase of an example loop gain corresponding to FIG. 9C according to one or more embodiments shown and described herein.

The non-modulated SAHC feedback path controls low frequency current and sets the linear duty cycle operating point for the modulated current feedback paths. The non-modulated portion of the bridge current depends mainly on the duty cycle of gate signal $\vec{g}_{CD,f}$ the second voltage bus $\vec{V}_{2,f}$, and the parallel impedance due to inductance $\vec{Z}_{Lm}$. The other terms in EQ4 are rejected at low frequencies due to the capacitor (CR) in the resonant network impedance, $\vec{Z}_R$. The low frequency loop gain is:

$$LG_0[f] = k[f] = k[f] \cdot Y_{Lm}[f] \cdot 2 \cdot V_2,\ f=DC \quad \text{EQ8}$$

where $LG_0[f]$ is the loop gain for the non-modulated (low frequency path), k[$f$] represents frequency dependent compensator dynamics, and the admittance $Y_{Lm}[f]$ is the inverse of impedance $Z_{Lm}[f]$. The loop gain represents the path around a loop from a duty cycle input to modulated voltage to low frequency current to a compensator which provides a duty cycle command. FIG. 9A and FIG. 9B illustrates an example low frequency loop gain, $LG_0$, magnitude (901) and phase (903) respectively. The SAHC compensator commands a relative duty cycle signal, $\overline{\delta d}_f$, to pulse width modulation processes to generate gate signals, $\vec{g}_{C,f}$ and $\vec{g}_{D,f}$. A differential duty cycle can be applied by applying differentially perturbed commands $\vec{d}_2 + \overline{\delta d}_f$ and $\vec{d}_2 - \overline{\delta d}_f$ to separate pulse width modulation processes for $\vec{g}_{C,f}$ and $\vec{g}_{D,f}$. Alternately, $\vec{g}_{D,t}$ can be set equal to the complement of $\vec{g}_{C,t}$ to results in differentially applied duty cycles to each gate signal.

The modulated SAHC path feeds back on a square wave modulated synchronous bridge current signal to reject reactive current and linearize the harmonic system response. The closed loop response of the power system is given by the superposition of an open loop admittance and a change in admittance due to control for each input voltage and output current combination:

$$I_{1:V1}[f] = Y_{(AB,AB)}[f] - \frac{Y_{(AB,SQ)}[f] \cdot g \cdot k[f] \cdot Y_{(SQ,AB)}[f]}{1 + g \cdot k[f] \cdot Y_{(SQ,SQ)}[f]} \quad \text{EQ9A}$$

$$I_{1:V2}[f] = Y_{(AB,CD)}[f] - \frac{Y_{(AB,SQ)}[f] \cdot g \cdot k[f] \cdot Y_{(SQ,CD)}[f]}{1 + g \cdot k[f] \cdot Y_{(SQ,SQ)}[f]} \quad \text{EQ9B}$$

$$I_{2:V1}[f] = Y_{(CD,AB)}[f] - \frac{Y_{(CD,SQ)}[f] \cdot g \cdot k[f] \cdot Y_{(SQ,AB)}[f]}{1 + g \cdot k[f] \cdot Y_{(SQ,SQ)}[f]} \quad \text{EQ9C}$$

$$I_{2:V2}[f] = Y_{(CD,CD)}[f] - \frac{Y_{(CD,SQ)}[f] \cdot g \cdot k[f] \cdot Y_{(SQ,CD)}[f]}{1 + g \cdot k[f] \cdot Y_{(SQ,SQ)}[f]} \quad \text{EQ9D}$$

where $I_{1:V1}[f]$ is the I1 current due to V1 bus perturbations, $I_{1:V2}[f]$ is the I1 current due to V2 bus perturbations, $I_{2:V1}[f]$ is the I2 current due to V1 bus perturbations, and $I_{2:V2}[f]$ is the I2 current due to V2 bus perturbations. Each of EQ14A, EQ14B, EQ14C, EQ14D superimposes an open loop admittance with the change in admittance due to control. The SAHC controller acts to superimpose a dynamic admittance which subtracts symmetry errors in the response about the switching frequency. Each of the cross modulated terms, $Y_{(SQ,AB)}$, $Y_{(SQ,CD)}$, $Y_{(AB,SQ)}$ and $Y_{(CD,SQ)}$ which conjugate gate which result in each term performing a symmetry error calculation by proportionally subtracting $\overline{Y}_R[f_c-f]$ from $Y_R[f_c+f]$. The cross modulated terms are calculated in accordance with EQ7B using the square wave gate signal, $\vec{g}_{SQ,f}$, as an argument. When the switching frequency aligns with the natural frequency of the resonant network, the magnitude and phase about either side of resonance are approximately conjugate symmetric resulting in the cross terms approaching zero so that the open loop admittance is unmodified. When the switching frequency is different than the natural frequency of the resonant network, the cross modulated terms multiply together to form an error proportional to the admittance symmetry error. The controller actively superimposes an admittance term which modifies the open loop admittance so that the total closed loop admittance aligns a modified closed loop natural frequency with the switching frequency. Over the bandwidth where loop gain $LG_1[f]$ is greater than one, the $g \cdot k[f]$ term in each numerator and denominator cancels to approach an ideal projection. The equations represent a projection where the component of open loop modulated admittance which aligns with the conjugate symmetry error metric is constrained from the system by the controller.

The loop gain, $LG_1[f]$, for the modulated SAHC compensator feedback path is developed using the plant, $Y_{\langle SQ,SQ \rangle}$, which projects from modulated phase command to modulated bridge current:

$$Y_{\langle SQ,SQ \rangle}[f] = \left(\frac{4}{\pi^2}\right) \cdot \left(\overline{Y}_{Lm\|R}[f_c - f] + Y_{Lm\|R}[f + f_c]\right) \quad \text{EQ10A}$$

$$g = \sin(\pi \cdot d_2) \cdot \left(\frac{\pi}{2}\right) \cdot V_{2,f=DC} \quad \text{EQ10B}$$

$$LG_1[f] = g \cdot k[f] \cdot Y_{\langle SQ,SQ \rangle}[f] \quad \text{EQ10C}$$

where g is a linearized constant based on the bridge duty cycle, and $k[f]$ is the compensator gain for an SAHC compensator (for example FIG. 4A or FIG. 4B). FIG. 9A and FIG. 9B illustrates the magnitude (902—LG1_5P) and phase (904—LG1_5P) respectively for a loop gain $LG_1[f]$ of a system with 5% tuning difference between the switching frequency and resonant network frequency.

The example of loop gain, $LG_1[f]$, shown in the Bode plot given in FIG. 9A and FIG. 9B respectively demonstrates stability at all gains. Modulated current due to modulated phase command, $\vec{Y}_{\langle SQ,SQ \rangle}$, is dominated by an integrative slope (see 804, FIG. 8D between zero hertz and the switching frequency) which corresponds to a 90 degree phase shift. The SAHC compensator shown in FIG. 4A and FIG. 4B is tuned for a less than 90 degree phase shift by placing resistors in parallel with the switched capacitors (C1A and C2A, or C1B and C2B) to balance reduction in tracking error with stability phase margin. Another method to feedback on modulated current error is to use a phase locked loop comprised of an error amplifier and voltage controlled oscillator (VCO), but the VCO adds an additional integrator which is not recommended due to conditional stability. The recommended SAHC compensator has favorable system dynamics relative to the open loop dynamics of the resonant power supply. FIG. 4B illustrates an optional element (R3B) across the switched capacitors which may be used to tune the compensation gain of the modulated and non-modulated paths of the SAHC circuit independently to further tune system performance.

The synchronous average harmonic current controller linearizes closed loop admittance (EQ9A, EQ9B, EQ9C, and EQ9D) by superimposing an active admittance to align the controlled natural resonance with the switching frequency. This characteristic allows for one or more resonant power supplies (with component tolerances) to be synchronously clocked with deterministic behavior similar to that of a non-isolated buck boost power converter (see FIG. 2B, FIG. 6A and FIG. 6B). The dynamic system equations are evaluated over the control bandwidth with gate signals calculated similar to EQ2 to result in the following linearized harmonic voltage coupling equations, where the equivalent linear system is inductive after superimposing the effects of control.

$$I_1[f] = -\sin(d_1\pi) \cdot I_{QSQ}[f] \quad \text{EQ11A}$$

$$I_2[f] = +\sin(d_2\pi) \cdot I_{QSQ}[f] \quad \text{EQ11B}$$

$$I_{QSQ}[f] = \quad \text{EQ11C}$$
$$-\left(\frac{\pi^2}{8}R_0 + j2\pi f \cdot \frac{\pi^2}{4}L_R\right)^{-1} \cdot \left(\sin(d_1\pi) \cdot \vec{V}_1[f] - \sin(d_2\pi) \cdot \vec{V}_2[f]\right)$$

The bus currents, $I_1[f]$ and $I_2[f]$, are related to the quadrature current, $I_{QSQ}[f]$, estimate of linearized harmonic current. A harmonic resistance is given by $$\frac{\pi^2}{8}R_0$$

where $R_0$ is the effective series resistance of the switches and resonant network. A harmonic inductance is given by $$\frac{\pi^2}{4}L_R,$$

where $L_R$ is the inductance associated with the resonant network. The equivalent harmonic resistance and inductance may be used to populate parameters in a linearized design model, such as LQSQ as illustrated in FIG. 6A and FIG. 6B.

The quadrature current controller acts on measured quadrature current, $I_{QSQ}[f]$, which is a modulated estimate of harmonically transmitted bridge current. The harmonic current, as illustrated in FIG. 6A and FIG. 6B using label IQSQ, cannot be measured directly as a linear term because the term exists in a modulated reference frame, so it is linearized by modulating a bridge current signal by a quadrature square wave to measure quadrature current. EQ11A and EQ11B show that respective currents to each bus $I_1[f]$ and $I_2[f]$, are a function of $I_{QSQ}[f]$. The measured quadrature current is a more suitable feedback signal for harmonic buck-boost converters than the bus currents $I_1[f]$ and $I_2[f]$ which can drop to zero as duty cycles approach limits of 0 or 1, while harmonic current may still be flowing. A system which feeds back on bus current directly may be subject to lock up at limiting duty cycles. The quadrature current is also a more linear feedback signal than bus current, which has an additional multiplicative nonlinearity relative to quadrature current.

The linearized harmonic current (using quadrature current) given in EQ11C may be controlled by altering one or more of the respective bridge duty cycles. The embodiment illustrated in FIG. 3 uses a quadrature current compensator to track a quadrature current command using $d_2$. The loop gain for the quadrature current compensator, $LG_2[f]$, may be found by taking the derivative of EQ15C with respect to the regulation duty cycle, such as shown in EQ11C for $d_2$:

$$LG_2[f] = k_2[f] \cdot \left(\frac{8}{\pi}\right) \cdot \frac{1}{R + j2\pi f \cdot 2L} \cdot \cos(\pi \cdot d_2) \cdot V_{2,f=DC} \quad \text{EQ12}$$

where $k_2[f]$ is a compensator gain associated with an opamp error amplifier such as illustrated in FIG. 5. The compensator is straightforward to design for stable operation due to linearized dynamics.

The quadrature current block (FIG. 5) uses command limiting to keep linearized harmonic current within limits, and may be complemented by real-time current limiting of measured bridge current. Real time current limiting may be implemented using window comparators to compare measured bridge current (VICD) to positive and negative limits to shut down bridge switches. The comparators may be implemented using simple limits or hysteretic limits using positive feedback from comparator output to shut down for one or more cycles to avoid interaction with stored resonant energy. The loop gain given in EQ12 (905, 906 FIG. 9C and 907, 908 FIG. 9D) integrates well with real-time current limiting due to the linearized plant dynamics so that operation may be quickly recovered after applying real-time limiting. Other voltage feedback methods may unintentionally create a boosted voltage during limiting due to a lower duty cycle, or have problems with wind-up or latch-up during limiting. A voltage linearization loop outer loop on a quadrature current commanded inner loop may be implemented with stable and latch-up free behavior during current limiting.

Figure 10A:
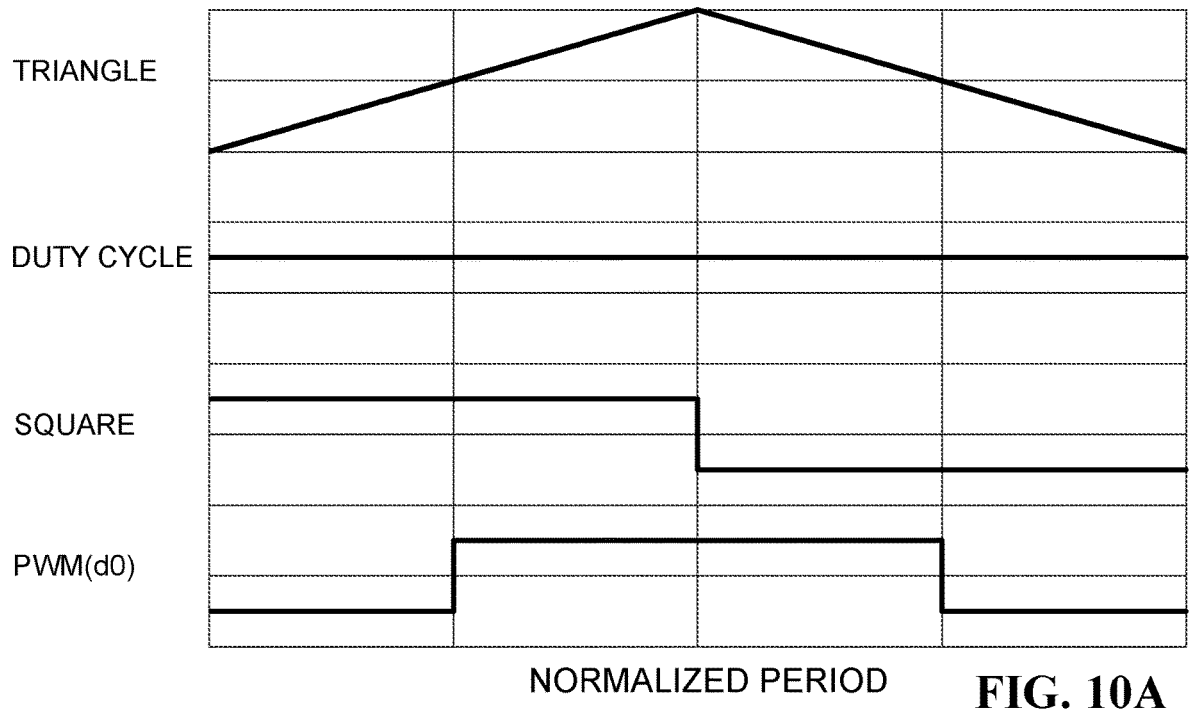
FIG. 10A illustrates examples of waveforms used to perform pulse width modulation of duty cycle and phase commands according to one or more embodiments shown and described herein.
Figure 10B:
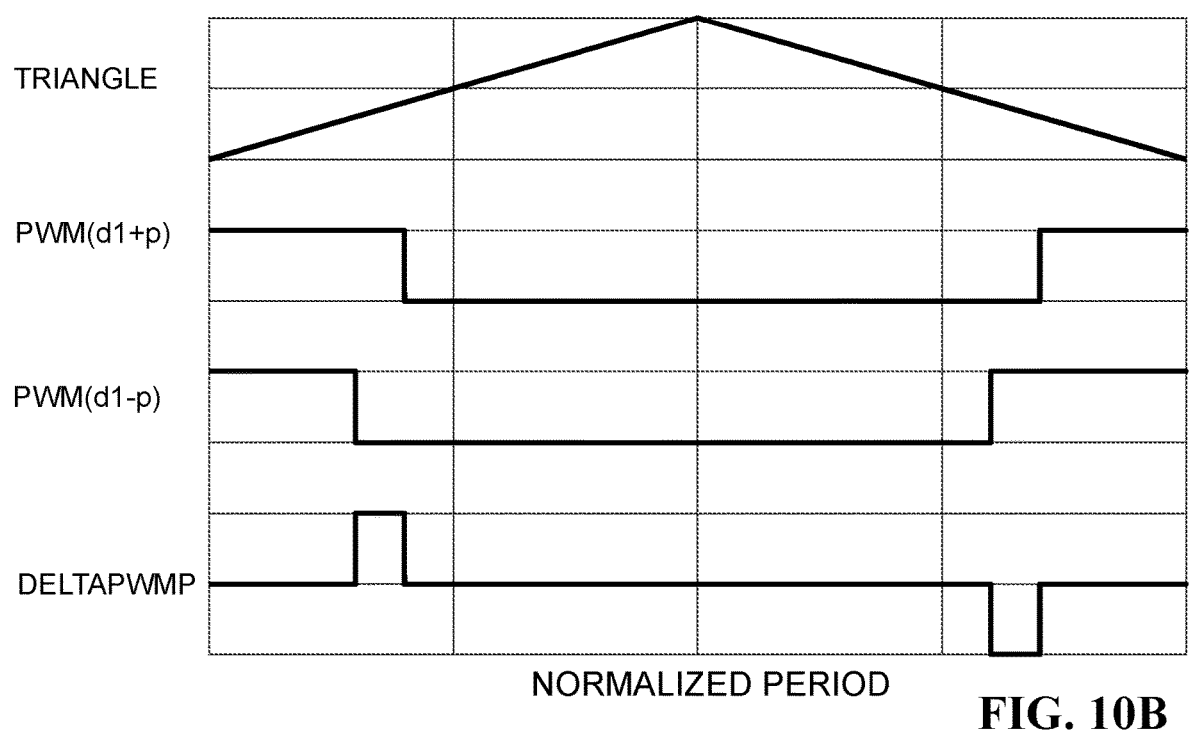
FIG. 10B illustrates a model of modulated output due to differences in a phase command according to one or more embodiments shown and described herein.
Figure 11A:
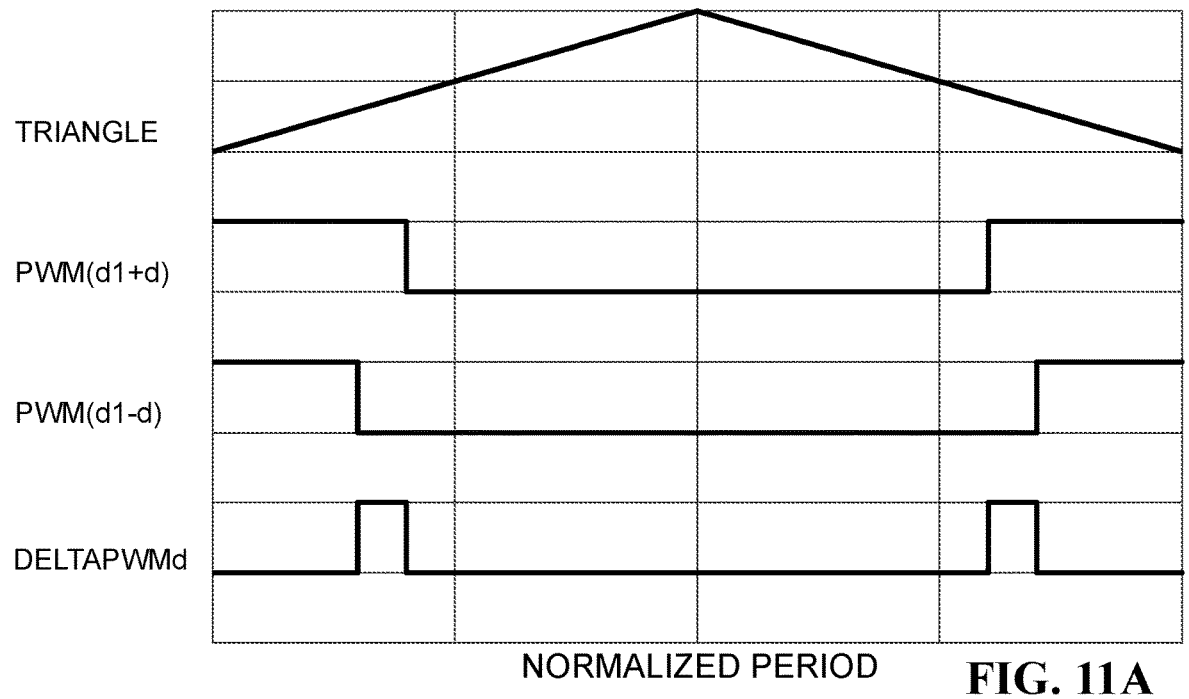
FIG. 11A illustrates a model of modulated output due to differences in duty cycle command according to one or more embodiments shown and described herein.
Figure 11B:
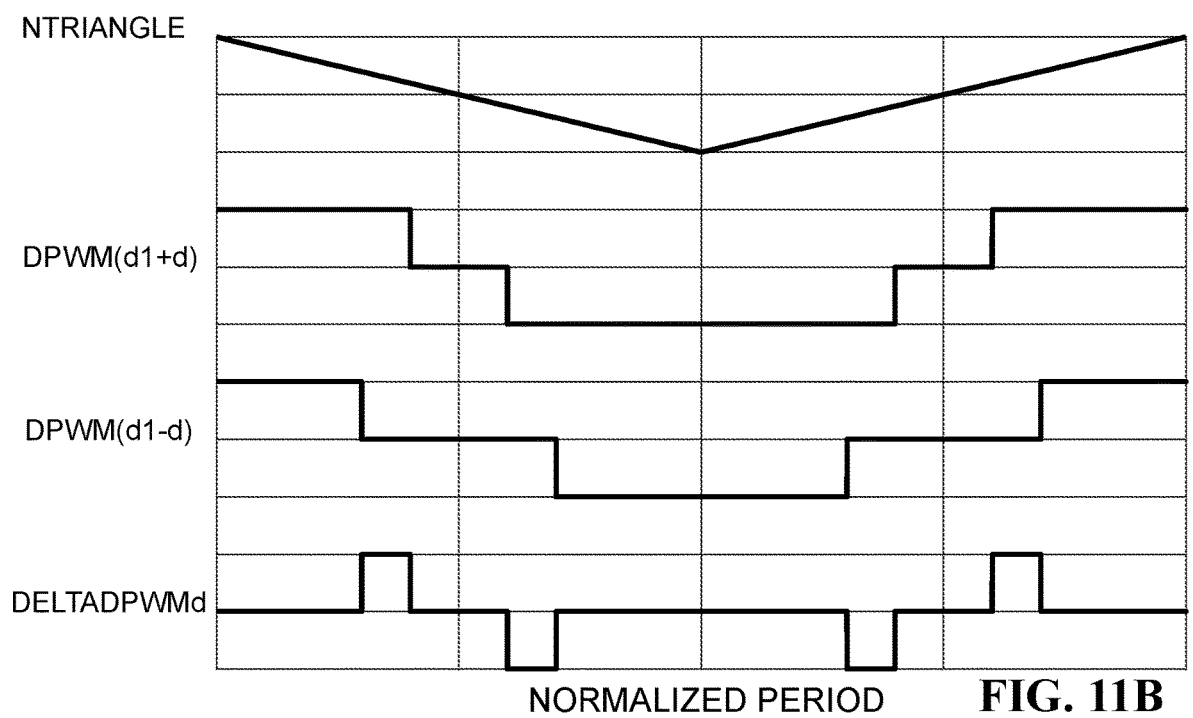
FIG. 11B illustrates a model of modulated output due to differences in a differentially modulated duty cycle command according to one or more embodiments shown and described herein.

The mathematical description is complemented by modulation illustrations shown in FIG. 10 and FIG. 11. FIG. 10A illustrates typical inputs to a pulse width modulation process for a switching period, including a TRIANGLE, DUTY CYCLE, and SQUARE waveform. The modulation output, PWM(d0), illustrates a comparison of a DUTY CYCLE signal with a TRIANGLE signal to result in a pulse width modulation signal. FIG. 10B illustrates a differential phase shift operation, where a SQUARE wave is added to a DUTY CYCLE and compared to the TRIANGLE to result in a positive phase shifted signal PWM(d1+p), and a SQUARE wave is subtracted to result in a negative phase shifted signal PWM(d1−p). The difference between the positive and negative phase shifted signals, DELTAPWMP, is representative of the differential sensitivity of pulse width modulation to square wave modulated phase commands. One can approximate DELTAPWMP by multiplying a linear input by a square wave which has positive polarity over the first half of the normalized period and negative polarity over the second half of the normalized period. FIG. 11A illustrates a differential duty cycle operation, where a positively perturbed DUTY CYCLE is compared to a TRIANGLE wave to result in PWM(d1+d), and a negatively perturbed DUTY CYCLE is compared to result in PWM(d1−d). The difference between the positive and negative duty cycle perturbation is DELTAPWMd, which can be approximated using a linear duty cycle. FIG. 11B illustrates NTRIANGLE which is the negative of a TRIANGLE waveform. The plot for DPWM (d1+d) illustrates the difference of two duty cycle modulation processes with (d1+d) duty cycle input using modulation against positive TRIANGLE and negative NTRIANGLE waves, where the linear average is zero and the first harmonic content is non-zero. The modulation illustrated in FIG. 11B may be used to alter transformer coupled voltage without resulting in low frequency current response. The plot for DPWM(d1−d) uses the same process as DPWM(d1+d) but with the duty cycle input altered to (d1−d). The difference between DPWM(d1+d) and DPWM (d1−d) is illustrated using DELTAPWM which is representative of differential sensitivity of pulse width modulated transformer voltage to duty cycle inputs. The pattern shown in DELTADPWMd may be approximated by multiplying a duty cycle by a quadrature square wave where the polarity is positive for the second and third quadrants and negative for the first and fourth quadrants. The pulse width modulation operators illustrated in FIG. 10A, FIG. 10B, FIG. 11A, and FIG. 11B may be combined in various polarities to achieve common and differential pulse width modulation of phase and duty cycle signals respectively.

An embodiment of a synchronous quadrature current controlled resonant power converter with a current controlled line connection is illustrated in FIG. 12. The embodiment shown in FIG. 3 uses a line connected voltage controlled bridge, and an isolated current controlled bridge which supports regulation between isolated DC buses. The embodiment shown in FIG. 12 uses a line connected current controlled bridge, and an isolated voltage controlled bridge which supports regulation between isolated DC buses. The major blocks shown in FIG. 12 include: a voltage controlled bridge (1201) connected to an isolation transformer (1210 and 1210(2)) through a resonant network (1205), a current controlled bridge (1202), a quadrature current compensator (1208) driven pulse width modulation process (1207), and a set of current sense amplifiers (1206) which drive a synchronous average harmonic current (SAHC1 and SAHC2) controlled pulse width modulation process (1209 and 1209 (2)). The respective blocks are described in further detail.

The current controlled bridge (1202) embodiment illustrated in FIG. 12 is further comprised of a set of switches which are coupled to a line (VAC) through an inductor (L1) and an isolation transformer (1210 and 1210(2)). The bridge (1202) is shown in a current interleaved arrangement with multiple sets of complementary switches (SC and SCN, SC(2) and SCN(2), SD and SDN, and SD(2) and SDN(2)). The switches comprising the current controlled bridge are implemented according to the state of the art, with materials selected to balance application cost, switching loss, and conduction loss requirements (examples include MOSFETs, GANFETs, SICFETs, IGBTs). The respective switches, SC, SC(2), SD, and SD(2), are driven according to the state of the art with gate drive signals, gC, gC(2), gD, gD(2). Switch complements including, SCN, SCN(2), SDN, SDN(2), are respectively driven with complementary inputs according to the state of the art, implemented with sufficient dead time to prevent cross-conduction. The current controlled bridge switches are coupled to the bus voltage V2 relative a voltage potential 1204, and energy storage capacitor CS2. The switched bridge nodes, VC, VC(2), VD, and VD(2) are coupled to a line (VAC) through magnetically coupled inductive elements. The VC node coupled isolation transformer (1210) couples inductors LT1, LT2, LT2(2), and the VD node coupled isolation transformer (1210(2)) couples inductors LT3, LT4, LT4(2). The magnetic arrangement shown, used with the synchronous average harmonic current controller (SAHC1 and SAHC2), results in flux balance for both AC and DC current terms for each isolation transformer. The integrated magnetics (1210 and 1210(2)) may be relatively smaller as a result of small unbalanced flux, and the inductor (L1) in series with the line connected voltage (VAC) may be smaller given reduced harmonic filtering requirements due to harmonic cancellation. The inductor (L1) may be explicit or may be formed by transformer leakage inductance.

Current flowing across the current controlled bridge nodes (VC and VD, VC(2) and VD(2)) is sensed using a set of current sense amplifiers (1206) to drive respective synchronous average harmonic current (SAHC1 and SAHC2) compensator and quadrature current (QC) compensator controlled pulse width modulation processes (1209, 1209(2) and 1207). The current sense amplifiers are further comprised of resistive shunts (RSC and RSD, RSC(2) and RSD(2)) and a set of difference amplifiers (DAMP1, DAMP2, DAMP3). A differential amplifier is connected to each respective set of bridge shunt resistors, with DAMP1 taking the difference between the voltage across RSC and RSD, and DAMP2 taking the difference between the voltage across RSC(2) and RSD(2). The output of DAMP1, given by VICD1, represents superimposed line current and positive isolation transformer current which drives a synchronous harmonic current compensator (SAHC1). The output of DAMP2, given by VICD2, represents superimposed line current and negative isolation transformer current which drives SAHC2. The output of DAMP3 nulls line current from the signal by subtracting VICD1 from VICD2 to drive the quadrature current (QC) compensator. The synchronous average harmonic current compensators (SAHC1 and SAHC2) are implemented in the embodiment shown similar to the inverting switched capacitor filter circuit (SAHC(B)) described in FIG. 4B. The output of the respective compensators, SAHC1 and SAHC2, drive respective superimposed duty cycle and phase signals, d2p2 and d2p2(2), to result in synchronously controlled (using SQ) current command (ICMD) tracking. The control signals, d2p2 and d2p2(2), drive SAHC pulse width modulation processes (1209 and 1209(2)) relative to a triangle waveform (TRI) and its inverse (NTRI) to generate respective gate signals, gC, gD, gC(2) and gD(2). The synchronous average harmonic current linearization results in harmonically balanced current sharing across inductive transformer elements, reduction of reactive current, and harmonic coupling between voltage buses (V1 and V2). Dynamic current flow between voltage buses is linearized using the quadrature current (QC) compensated (1208) pulse width modulation stage (1207). The differential amplifier (DAMP3) nulls line current and the SAHC compensator attenuates reactive current from the signal to result in a transmitted current signal to drive the QC compensator. The QC compensator has additional inputs of a quadrature square (QSQ) wave and commanded quadrature current (IQCMD). The QC compensator process, described in FIG. 5, estimates harmonic current by multiplying the transmitted portion of bridge current by the quadrature square wave and applies negative feedback to result in tracking relative to command. The QC pulse width modulation process (1207) compares compensator input against a synchronous positive triangle waveform (TRI) and synchronous negative triangle waveform (NTRI) to generate respective gate control signals, gA, gAN, gB and gBN.

Pulse width modulated duty cycle output from the quadrature current compensator is used to regulate the primary harmonic voltage of a voltage controlled bridge (1201) which results in harmonic current flow relative to the secondary harmonic voltage of the current controlled bridge. The voltage controlled bridge (1201) is further comprised of complementary sets of switches, SA and SAN, and SB and SBN respectively. The switches are implemented according to the state of the art based on application requirements for cost, switching and conduction loss, for example using materials such as MOSFETs, GANFETs, SICFETs, or IGBTs. Complementary switches are driven with appropriate deadtime to reduce cross conduction using respective gate signals, gA and gAN, and gB and gBN, implemented according to the state of the art. The bridge is connected at nodes, VA and VB, to inductive elements LT1 and LT3 which are magnetically coupled to isolation transformers in series with a resonant network (1205) formed by LR and CR. The bridge is connected across a voltage bus (V1) relative to a voltage potential (1203) in parallel with an energy storage capacitor (CS1). The synchronous relationship between the respective bridges (1201 and 1202) results in single stage isolated buck-boost regulation between voltage buses, with controlled current through a line connected voltage (VAC) and favorable magnetic integration. Regulated power factor correction (PFC) may be implemented according to the state of the art using the single stage converter by driving the current command (ICMD) with a PFC controller comprising a voltage error amplifier and a line current command shaping circuit. Bus voltages (V1 and V2) may be regulated by using a voltage error amplifier to drive the quadrature current command (IQCMD).

Additional embodiments may be formed with minor modifications to FIG. 12 in order to support different application requirements. The embodiment shown in FIG. 12 is representative of an application where transformer and inductor materials are reduced by balancing transformer flux and cancelling harmonics. A reduced part embodiment may be formed by reducing current balancing switching components (post-scripted with (2)) including: SC(2), SCN(2), SD(2), SDN(2), LT2(2), LT4(2), DAMP2, and 1209(2). The reduced part embodiment may include a capacitor connected between the bottom terminals of LT2 and LT4 to provide a low impedance connection between transformer nodes. The reduced part embodiment cancels first harmonic voltage across the line connection (VAC) by superposition of VCD with the resonant filtered transformer coupled voltage VAB. The reduced part embodiment may be subject to unbalanced DC currents, for which a transformer may be modified using an air gap to reduce flux. A soft-switching bridge embodiment may be implemented by replacing anti-parallel switches with low loss diodes, for example by replacing SCN, SC(2), SD(2) and SDN with silicon carbide diodes. The soft-switching bridge embodiment bypasses the internal body diode of switches in the current controlled bridge using an inductive element and external diode. A capacitive half-bridge embodiment may be formed by replacing the connection between line inductor, L1, and coupled inductors, LT4 and LT4(2), with a connection to a capacitance coupled to the voltage bus or reference potential or both. A similar embodiment may be formed by tying the half bridge connection at L1 to a virtual ground, for example using a node which has phased harmonically cancelling currents. Multiple virtual ground half bridge embodiments may be combined according to the state of the art to implement a single stage three phase power converter.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A power converter comprising:
   a voltage controlled bridge circuit comprising a first plurality of switching devices across a first voltage bus and first energy storage capacitor, wherein the first plurality of switches are coupled to a first transformer winding of a transformer device;
   a voltage controller circuit configured to pulse width modulate the first bus voltage by comparing a voltage command to a synchronous modulation waveform to control the first plurality of switching devices associated with a primary harmonic voltage;
   a current controlled bridge circuit comprising a second plurality of switching devices across a second voltage bus and second energy storage capacitor, wherein the second plurality of switches are coupled to a second transformer winding of the transformer device;
   a resonant network comprised of a capacitance element and an inductance element coupled with: the first transformer winding, or the second transformer winding, or both the first transformer winding and the second transformer winding;
   a bridge current sensor configured to measure a signal related to current flow across switching nodes of the current controlled bridge circuit;
   a current controller circuit configured to pulse width modulate the second bus voltage by comparing the synchronous modulation waveform and a superimposed feedback signal to control the second plurality of switching devices associated with a secondary harmonic voltage; the superimposed feedback signal comprising a non-modulated signal and a modulated signal;
   a synchronous average harmonic current compensator configured to integrate and compensate error between a current command and the bridge current sensor signal synchronously over each half of a square wave switching period and sample compensator output to generate the superimposed feedback signal;
   a line coupled to: switching nodes of the voltage controlled bridge, or switching nodes of the current controlled bridge;
   an isolated bridge command; and
   a quadrature current compensator configured to reduce tracking error between a quadrature current command and an estimated linearized harmonic current flow between the primary harmonic voltage and secondary harmonic voltage using the isolated bridge command.

2. The power converter of claim 1, wherein the synchronous average harmonic current compensator is further comprised of a non-inverting switched capacitor filter with a resistive input and switched capacitance elements which are alternately switched and sampled over each half period synchronously with the square wave switching period.

3. The power converter of claim 1, wherein the synchronous average harmonic current compensator is further comprised of an inverting switched capacitor filter with an inverting resistive summing input and switched capacitance elements which are alternately switched and sampled over each half period synchronously with the square wave switching period.

4. The power converter of claim 1, wherein the bridge current sensor is further comprised of at least one resistive shunt and preamplifier which measures a linear combination of a transmitted current, a reactive current, and a bridge recirculating current where the bridge recirculating current and the reactive current are attenuated by the synchronous average harmonic current compensator.

5. The power converter of claim 1, wherein the bridge current sensor superimposes multiple bridge current signals to drive the synchronous average harmonic current compensator and drives the quadrature current compensator with a linear combination of transmitted current and cancelled local bridge current and attenuated reactive current signals.

6. The power converter of claim 1, wherein the quadrature current compensator is further comprised of an analog current multiplying input which forms a quadrature current signal by multiplying the bridge current sensor signal by a quadrature square wave to estimate harmonic current flow and feeds back on the quadrature current signal error relative to the quadrature current command.

7. The power converter of claim 1, wherein the bridge current sensor signal is compared to fixed or hysteretic current limits to shutdown the voltage controlled bridge, or the current controlled bridge, or both the voltage controlled bridge and current controlled bridge.

8. The power converter of claim 1, wherein the quadrature current command is limited by a saturation function relative to harmonic current limits.

9. The power converter of claim 1, wherein the line is coupled to the voltage controlled bridge, and the isolated bridge command is applied to a current controller circuit duty cycle input.

10. The power converter of claim 1, wherein the line is coupled to the current controlled bridge, and the isolated bridge command is applied to a voltage controller circuit duty cycle input.

11. The power converter of claim 1, wherein the leakage inductance of the transformer device forms part of the resonant network, and the synchronous average harmonic current compensator imparts an active admittance which forms part of the resonant network.

12. The power converter of claim 1, wherein the voltage controller uses an inverted and non-inverted pulse width modulation input to drive the voltage controlled bridge.

13. The power converter of claim 1, wherein the current controller uses an inverted and non-inverted pulse width modulation input to drive the current controlled bridge.

14. The power converter of claim 1, wherein the line coupled bridge comprises a full bridge circuit comprising at least two pairs of switching devices.

15. The power converter of claim 1, wherein the line coupled bridge comprises at least two switching devices coupled to a virtual node formed by a capacitive half bridge, or a connection to a power source with cancelling current phases.

16. The power converter of claim 1, wherein the line is connected to bridge nodes through the transformer device, wherein a line filter is formed by the inductance of the transformer device, or an external inductor, or both an external inductor and the transformer device.

17. The power converter of claim 1, wherein voltage feedback regulation is performed by an error amplifier which drives the quadrature current command signal to one or more synchronous power converter modules.

18. The power converter of claim 1, wherein a three phase line is connected across multiple synchronous power converter modules.

19. A method comprising:
   driving a line current or voltage with a line connected bridge which is also coupled to a DC bus voltage and harmonically coupled across an isolation transformer to an isolated bridge and DC bus using a single stage without a diode bridge rectifier;

coupling a primary harmonic voltage of the line connected bridge to a secondary harmonic voltage of the isolated bridge by sensing, compensating and sampling a synchronous average current over each half switching period of a synchronous square wave, and superimposing a feedback signal on a modulation waveform; and regulating an estimate of linearized harmonic current transferred between bridges by reducing error between a commanded quadrature current and an estimate of harmonically transmitted current.

20. The method of claim 19, further comprising synchronization and controlled power sharing between one or more power converter bridges.

\* \* \* \* \*